United States Patent
Zhang et al.

(10) Patent No.: US 11,825,448 B2
(45) Date of Patent: Nov. 21, 2023

(54) TECHNIQUES FOR PRIORITIZING COMMUNICATION FOR SIDELINK COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/224,930

(22) Filed: Apr. 7, 2021

(65) Prior Publication Data
US 2021/0321367 A1   Oct. 14, 2021

Related U.S. Application Data

(60) Provisional application No. 63/008,582, filed on Apr. 10, 2020.

(51) Int. Cl.
*H04W 72/02* (2009.01)
*H04W 76/14* (2018.01)
(Continued)

(52) U.S. Cl.
CPC .......... *H04W 72/02* (2013.01); *H04W 72/23* (2023.01); *H04W 72/56* (2023.01); *H04W 76/14* (2018.02)

(58) Field of Classification Search
CPC ..... H04W 72/02; H04W 72/23; H04W 72/56; H04W 76/14; H04W 72/569
See application file for complete search history.

(56) References Cited

U.S. PATENT DOCUMENTS

2017/0367087 A1    12/2017 Seo
2019/0253977 A1*    8/2019 Wang ................. H04W 52/281
(Continued)

FOREIGN PATENT DOCUMENTS

WO    WO-2020006366 A1    1/2020

OTHER PUBLICATIONS

International Search Report and Written Opinion—PCT/US2021/026395—ISA/EPO—dated Jul. 12, 2021.
(Continued)

*Primary Examiner* — Michael K Phillips
(74) *Attorney, Agent, or Firm* — Dalei Dong; Holland & Hart LLP

(57) ABSTRACT

Methods, systems, and devices for wireless communications are described for prioritization of sidelink communications of a user equipment (UE) with one or more access link communications. A prioritization scheme may provide inter-UE and intra-UE prioritization that may be used to prioritize sidelink communications and one or more access link communications. Inter-UE prioritization may be used at the UE to determine whether to cancel all or a portion of a sidelink communication that uses resources indicated in a cancellation indication from a base station, or to transmit the sidelink communication irrespective of the cancellation indication. Intra-UE prioritization may be used at the UE to determine which of one or more access link communications or a sidelink communication is to be maintained or canceled in the event of overlapping resources between the access link and sidelink communications.

30 Claims, 14 Drawing Sheets

(51) Int. Cl.
*H04W 72/23* (2023.01)
*H04W 72/56* (2023.01)

(56) References Cited

U.S. PATENT DOCUMENTS

| | | | | |
|---|---|---|---|---|
| 2020/0045724 A1* | 2/2020 | Lu | .......................... | H04W 72/21 |
| 2020/0053723 A1* | 2/2020 | Hosseini | ............... | H04L 5/0092 |
| 2021/0105126 A1* | 4/2021 | Yi | .......................... | H04L 1/1854 |
| 2022/0124551 A1* | 4/2022 | Lu | .................... | H04W 28/0268 |
| 2022/0174682 A1* | 6/2022 | Li | ..................... | H04W 72/1263 |
| 2022/0216975 A1* | 7/2022 | Hwang | ................. | H04L 1/1896 |
| 2022/0312438 A1* | 9/2022 | Yi | .......................... | H04W 72/23 |
| 2022/0386355 A1* | 12/2022 | Yi | ......................... | H04B 7/0695 |
| 2022/0408455 A1* | 12/2022 | Yoshioka | ............. | H04W 72/21 |
| 2023/0082690 A1* | 3/2023 | Yoshioka | ............. | H04L 1/1861 |
| | | | | 370/329 |

OTHER PUBLICATIONS

Qualcomm Incorporated: "Uplink and Sidelink Prioritization in NR V2X", 3GPP Draft, 3GPP TSG RAN WG2 #107, R2-1910872, NR UU SL Prioritization, 3rd Generation Partnership Project (3GPP), Mobile Competence Centre, 650, Route Des Lucioles, F-06921 Sophia-Antipolis Cedex, France, vol. RAN WG2, No. Prague, Czechia, Aug. 16, 2019-Aug. 30, 2019, Aug. 15, 2019 (Aug. 15, 2019), XP051768639, 5 Pages, Retrieved from the Internet: URL: http://www.3gpp.org/ftp/tsg_ran/WG2_RL2/TSGR2_107/Docs/R2-1910872.zip. [Retrieved on Aug. 15, 2019] paragraphs [0001] [0002]. [02. 3].

* cited by examiner

TECHNIQUES FOR PRIORITIZING COMMUNICATION FOR SIDELINK COMMUNICATIONS

CROSS REFERENCE

The present application for Patent claims the benefit of U.S. Provisional Patent Application No. 63/008,582 by ZHANG et al., entitled "TECHNIQUES FOR PRIORITIZING COMMUNICATION FOR SIDELINK COMMUNICATIONS," filed Apr. 10, 2020, assigned to the assignee hereof, and expressly incorporated by reference herein.

FIELD OF TECHNOLOGY

The following relates generally to wireless communications and more specifically to techniques for prioritizing communication for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples). Efficient and reliable techniques for managing access link communication and sidelink communications may be desirable.

SUMMARY

The described techniques relate to improved methods, systems, devices, and apparatuses that support techniques for prioritizing communication for sidelink communications. In accordance with various aspects, a user equipment (UE) may be configured for sidelink communications, and may prioritize sidelink communications with access link communications in accordance with a prioritization scheme. In some cases, the UE may receive an uplink cancellation indication (CI) from a base station that indicates at least a portion of wireless resources that are configured for sidelink communications are to be used for a high priority communication at the base station (e.g., for high priority communications with another UE). The prioritization scheme may include inter-UE prioritization that may be used at the UE to determine whether to cancel all or a portion of a sidelink communication that uses resources indicated in the CI, or to transmit the sidelink communication irrespective of the CI. In some cases, additionally or alternatively, the prioritization scheme may include intra-UE prioritization that may be used at the UE to determine which of an access link communication or a sidelink communication is to be maintained or canceled in the event of overlapping resources between the access link and sidelink communications.

A method of wireless communication at a first UE is described. The method may include identifying a first set of resources for a first sidelink communication with a second UE, where the first sidelink communication has a first priority, receiving a first indication of a second set of resources for a second communication, the second communication having a second priority, where the second set of resources at least partially overlaps with the first set of resources, receiving a second indication of a third set of resources for a third communication, the third communication having a third priority, and determining to drop or to transmit the first sidelink communication based on a prioritization scheme associated with the first priority, the second priority, and the third priority.

An apparatus for wireless communication at a first UE is described. The apparatus may include a processor, memory coupled with the processor, and instructions stored in the memory. The instructions may be executable by the processor to cause the apparatus to identify a first set of resources for a first sidelink communication with a second UE, where the first sidelink communication has a first priority, receive a first indication of a second set of resources for a second communication, the second communication having a second priority, where the second set of resources at least partially overlaps with the first set of resources, receive a second indication of a third set of resources for a third communication, the third communication having a third priority, and determine to drop or to transmit the first sidelink communication based on a prioritization scheme associated with the first priority, the second priority, and the third priority.

Another apparatus for wireless communication at a first UE is described. The apparatus may include means for identifying a first set of resources for a first sidelink communication with a second UE, where the first sidelink communication has a first priority, receiving a first indication of a second set of resources for a second communication, the second communication having a second priority, where the second set of resources at least partially overlaps with the first set of resources, receiving a second indication of a third set of resources for a third communication, the third communication having a third priority, and determining to drop or to transmit the first sidelink communication based on a prioritization scheme associated with the first priority, the second priority, and the third priority.

A non-transitory computer-readable medium storing code for wireless communication at a first UE is described. The code may include instructions executable by a processor to identify a first set of resources for a first sidelink communication with a second UE, where the first sidelink communication has a first priority, receive a first indication of a second set of resources for a second communication, the second communication having a second priority, where the second set of resources at least partially overlaps with the first set of resources, receive a second indication of a third set of resources for a third communication, the third communication having a third priority, and determine to drop or to transmit the first sidelink communication based on a prioritization scheme associated with the first priority, the second priority, and the third priority.

In some examples of the method, apparatuses, and non-transitory computer-readable medium described herein, the prioritization scheme provides priorities between the first sidelink communication and an inter-UE cancellation indication that may be associated with the second communication, between the first sidelink communication and an intra-UE channel prioritization for uplink communications with a base station over two or more channels, or any combinations thereof. In some examples of the method, apparatuses, and non-transitory computer-readable medium described herein, the receiving the first indication may include operations, features, means, or instructions for receiving an uplink cancellation indication (UL CI) from a base station that indicates the second set of resources, and where the UL CI may be associated with the second priority and indicates one or more different UEs than the first UE are to transmit using the second set of resources.

In some examples of the method, apparatuses, and non-transitory computer-readable medium described herein, the determining may include operations, features, means, or instructions for determining to drop the first sidelink communication based on the second priority having a higher priority than the first priority. In some examples of the method, apparatuses, and non-transitory computer-readable medium described herein, the determining may include operations, features, means, or instructions for determining to transmit the first sidelink communication based on the second priority having a lower priority than the first priority. In some examples of the method, apparatuses, and non-transitory computer-readable medium described herein, the second priority may be assigned a same priority level as one or more uplink communications between the first UE and the base station. In some examples of the method, apparatuses, and non-transitory computer-readable medium described herein, the first priority may be assigned a higher priority level than the second priority, and the first sidelink communication always may have priority relative to UL CIs.

In some examples of the method, apparatuses, and non-transitory computer-readable medium described herein, the prioritization scheme provides priorities between the first sidelink communication, an uplink cancellation indication (UL CI) from the base station that indicates the second priority and the second set of resources, and the third communication between the first UE and a base station. In some examples of the method, apparatuses, and non-transitory computer-readable medium described herein, the determining further may include operations, features, means, or instructions for determining which of the third communication or the first sidelink communication has a higher priority prior to determining whether to honor the UL CI. In some examples of the method, apparatuses, and non-transitory computer-readable medium described herein, the determining further may include operations, features, means, or instructions for determining whether the second priority associated with the UL CI is a higher priority than one or more of the first priority or the third priority prior to determining whether the first priority has a higher priority than the third priority.

In some examples of the method, apparatuses, and non-transitory computer-readable medium described herein, the prioritization scheme provides priorities between the first sidelink communication, a first uplink communication between the first UE and a base station that has a first channel priority, and a second uplink communication between the first UE and the base station that has a second channel priority, and where the third set of resources is associated with one or more of the first uplink communication or the second uplink communication. In some examples of the method, apparatuses, and non-transitory computer-readable medium described herein, the prioritization scheme further provides that prioritization between the first sidelink communication and first and second uplink communications is performed prior to prioritization between the first uplink communication and the second uplink communication.

In some examples of the method, apparatuses, and non-transitory computer-readable medium described herein, a highest priority of the first channel priority and the second channel priority is selected as the second priority. In some examples of the method, apparatuses, and non-transitory computer-readable medium described herein, the prioritization between the first uplink communication and the second uplink communication is determined when the second priority is higher than the first priority and the first sidelink communication is dropped.

In some examples of the method, apparatuses, and non-transitory computer-readable medium described herein, the prioritization scheme further provides that prioritization is performed separately for the first sidelink communication and each of the first uplink communication and the second uplink communication. In some examples of the method, apparatuses, and non-transitory computer-readable medium described herein, the determining further may include operations, features, means, or instructions for determining to drop the first sidelink communication based on both the first uplink communication and the second uplink communication having a higher priority than the first sidelink communication, and determining which of the first uplink communication or the second uplink communication to transmit based on the first channel priority and the second channel priority.

In some examples of the method, apparatuses, and non-transitory computer-readable medium described herein, the determining further may include operations, features, means, or instructions for determining that the first uplink communication has priority over the second uplink communication based on the first channel priority and the second channel priority, setting the second priority to correspond to the first channel priority, and determining which of the first sidelink communication or the first uplink communication to transmit based on the first priority and the second priority.

DETAILED DESCRIPTION

Figure 1:
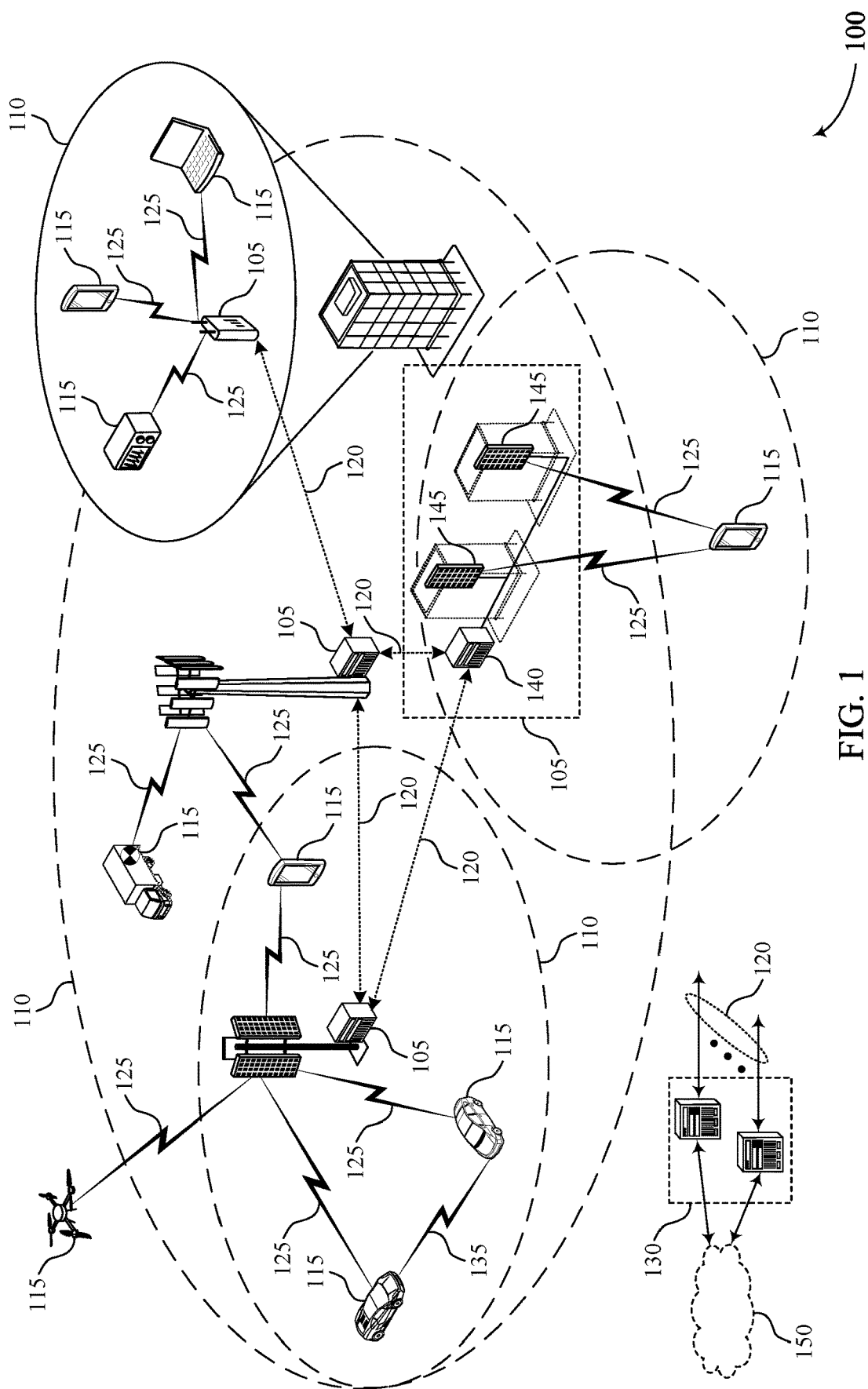
FIG. 1 illustrates an example of a system for wireless communications that supports techniques for prioritizing communication for sidelink communications in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc., and may be referred to as Uu link. A sidelink may refer to any communication link between similar wireless devices (e.g., a communication link between UEs, or a backhaul communication link between base stations), and may be referred to as a PC5 link. It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one wireless device to one or more other similar wireless devices (e.g., UEs).

In some examples, a sidelink device such as a UE may perform inter-UE prioritization, intra-UE prioritization, or combinations thereof, when resources associated with an access link communication overlap with sidelink resources for a sidelink communication. In some cases, the UE may be configured with a prioritization scheme that may be used to prioritize sidelink communications with access link communications. In some cases, inter-UE prioritization may be used when the UE receives an uplink cancellation indication (CI) from a base station that indicates at least a portion of wireless resources that are configured for sidelink communications are to be used for a high priority communication at the base station (e.g., for high priority communications with another UE). The inter-UE prioritization may be used at the UE to determine whether to cancel all or a portion of a sidelink communication that uses resources indicated in the CI, or to transmit the sidelink communication irrespective of the CI. In some cases, additionally or alternatively, the prioritization scheme may include intra-UE prioritization that may be used at the UE to determine which of one or more access link communications (e.g., a communications on one or more access link channels that have different priorities), a sidelink communication, or combinations thereof, are to be maintained or canceled in the event of overlapping resources between the access link and sidelink communications.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to reliability and efficiency in wireless operations. In some examples, the UEs may support high reliability through efficient prioritization, and cancellation if needed, of one or more instances of a sidelink communication. The described techniques may thus include features for improvements to reliability in communications, enhanced communications efficiency based on prioritization of communications, and, in some examples, may promote enhanced efficiency for high reliability and low latency operations, among other benefits.

Aspects of the disclosure are initially described in the context of wireless communications systems. Aspects of the disclosure are then illustrated by and described with reference to sidelink resources and access link resources, and a process flow that relate to prioritization of sidelink communications. Aspects of the disclosure are further illustrated by and described with reference to apparatus diagrams, system diagrams, and flowcharts that relate to techniques for prioritizing communication for sidelink communications.

FIG. 1 illustrates an example of a wireless communications system 100 that supports techniques for prioritizing communication for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a sidelink or device-to-device (D2D) communication link 135 (e.g., using a peer-to-peer (P2P) or D2D protocol, or a PC5 protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, sidelink communications may be enabled among devices in wireless communications system 100, such as between two or more UEs 115 via sidelink 135. In some cases, a prioritization scheme may provide inter-UE and intra-UE prioritization that may be used to prioritize sidelink communications and one or more access link communications. In some cases, a UE 115 may receive an uplink CI from a base station 105 that indicates at least a portion of wireless resources that are configured for sidelink communications are to be used for a high priority communication at the base station (e.g., for high priority communications with another UE 115). The prioritization scheme may include inter-UE prioritization that may be used at the UE to determine whether to cancel all or a portion of a sidelink communication that uses resources indicated in the CI, or to transmit the sidelink communication irrespective of the CI. In some cases, additionally or alternatively, intra-UE prioritization may be used at the UE 115 to determine which of one or more access link communications or a sidelink communication is to be maintained or canceled in the event of overlapping resources between the access link and sidelink communications.

Figure 2:
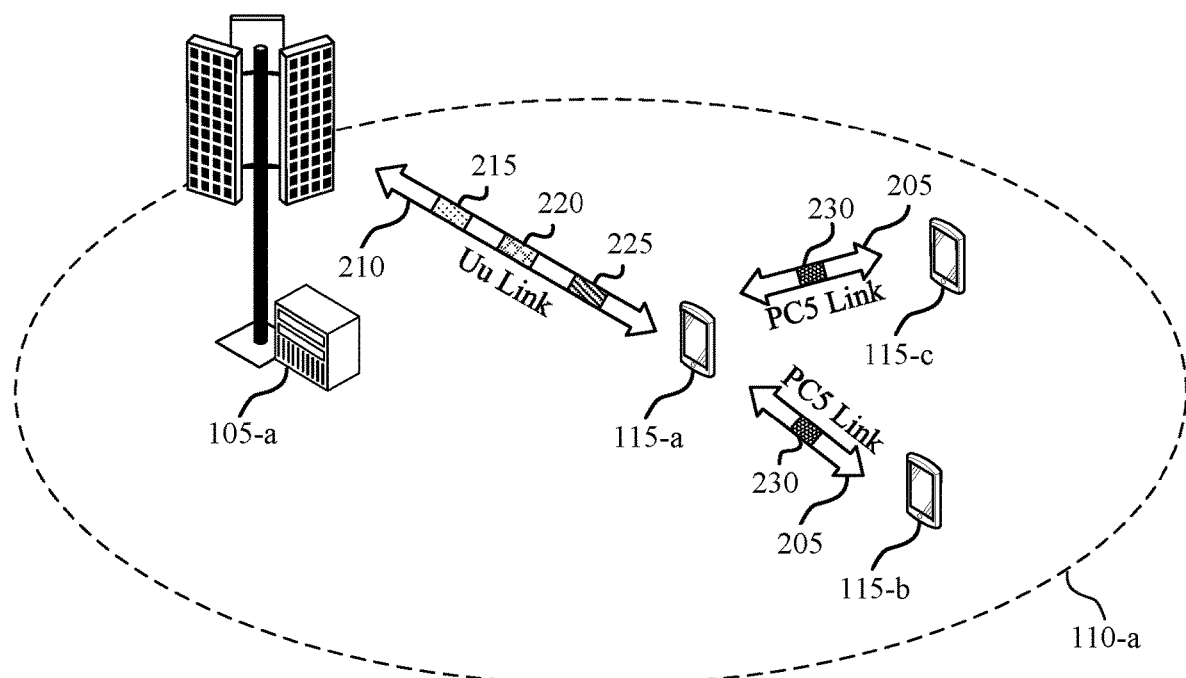
FIG. 2 illustrates an example of a wireless communications system that supports techniques for prioritizing communication for sidelink communications in accordance with aspects of the present disclosure.

FIG. 2 illustrates an example of a wireless communications system 200 that supports techniques for prioritizing communication for sidelink communications in accordance with aspects of the present disclosure. In some examples, the wireless communications system 200 may implement aspects of the wireless communication system 100. Wireless communications system 200 may include a base station 105-a and a group of UEs 115 (e.g., UE 115-a through UE 115-c), which may be examples of a base station 105 and UEs 115, respectively, described with reference to FIG. 1. In some cases, the group of UEs 115 may communicate with each other (e.g., within a V2X system, a D2D system, and the like) via sidelink communications.

According to some aspects, the group of UEs 115 may communicate sidelink communications 230 with each other (or with another group of UEs 115) over sidelinks 205, which may be referred to as PC5 links (e.g., using a peer-to-peer (P2P) or D2D protocol, such as a PC5 interface). For example, a UE 115-a may monitor resource pools for the sidelink 205 or indications of the sidelink resources (e.g., resource reservations, control channel transmissions, among other examples) from other UEs 115 in the group. Additionally or alternatively, the UEs 115 may have data to transmit to one or more of the UEs 115 in the group and may use the sidelinks 205 to transmit the data. In some examples, the group of UEs 115 may utilize sidelinks 205 in addition to access links 210 with the base station 105, which may be referred to as a Uu link or Uu interface.

For example, one or more of the UEs 115 may be in a coverage area 110-a (e.g., a coverage area 110 with reference to FIG. 1) of the base station 105. In such examples, one or more of the UEs 115, including UE 115-a, may communicate with the base station 105 via access link 210 (e.g., a Uu link for communications that may transmit downlink communications to one or more of the UEs 115 and carry uplink communications to the base station 105-a). In some other examples, one or more of the UEs 115 may not be inside the coverage area 110-a or may not communicate with the base station 105 using an access link. In some cases, the UEs 115 may be configured with one or more resource pools for the sidelinks 205 that may carry sidelink communications 230. In some deployments, there may be two modes specified for sidelink communications 230 (e.g., in NR sidelink (PC5) communications), including Mode 1 in which the base station 105-a allocates sidelink resources between UEs 115, and Mode 2 in which UEs 115 autonomously select sidelink resources without control from the base station 105-a. In mode 1, the base station 105-a may provide a dynamic grant or activate a configured sidelink grant for sidelink communications 230, and sidelink feedback (e.g. HARQ ACK/NACK feedback) may be reported back to the base station 105-a by the transmitting UE 115. In some cases, in order to enhance the reliability of high priority communications on an access link 210 or a sidelink 205, UEs 115 may be configured with a prioritization scheme for prioritizing one or more sidelink communications 230 relative to resources of the access link 210.

In some cases, for example, the base station 105-a may allocate resources for high priority traffic (e.g., a URLLC communication with a different UE than is shown in FIG. 2, which may be referred to as a "later UE") on an access link 210 with the later UE. Such resources may be allocated after all of a portion of the resources have already been allocated for other communications of, for example, first UE 115-a (which may be referred to as an "earlier UE"). In order to reduce the likelihood of interference in the allocated high priority resources, the base station 105-a may transmit a cancellation indicator 215. Such a cancellation indicator 215 may allow the base station 105-a to schedule the later UE with high priority traffic by signaling an earlier UE, to cancel lower priority traffic.

In some cases, the cancellation indicator 215 may be transmitted using a defined downlink control information (DCI) format (e.g., DCI format 2_4 in a NR system) that indicates a set of resources (e.g., a first set of resources) that are to be used for the high priority traffic. For example, if UE 115-a detects the defined DCI format (e.g., DCI format 2_4) for a serving cell, it may cancel an uplink transmission if one or more bits in a CI bitmap associated with the uplink resources overlaps with resources allocated to the UE 115-a (e.g., resources allocated for a PUSCH transmission, a repetition of a PUSCH transmission, or an SRS transmission on the access link 210). For example, if DCI format 2_4 includes a symbol and PRB of the uplink communication of the earlier UE 115-a (e.g., if a value of one or more $T_{CI}$ symbols have a bit value of '1' and a value of one or more $B_{CI}$ PRBs have a bit value of '1', and overlap resources of the earlier UE). In cases where the cancellation indicator 215 indicates resources that are allocated for uplink transmission of UE 115-a, the cancellation may include all symbols from an earliest symbol of the uplink transmission that overlap with the set of resources signaled by the cancellation indicator 215 continuing to the end of the uplink transmission. In cases where the uplink transmission is a SRS transmission, the canceled symbols may include only symbols that overlap with symbols indicated in the cancellation indicator 215. In accordance with various aspects of the present disclosure, as will be discussed in more detail with respect to FIG. 3, UE 115-a (or any other UEs 115 configured for sidelink transmissions), may determine whether to cancel one or more sidelink communications 230 when a cancellation indicator 215 is received based on a prioritization scheme.

In some cases, the prioritization scheme used at UEs 115 may also include prioritization for one or more of communications channels on the access link 210 (e.g., that may provide higher priority uplink communications 220 and lower priority uplink communications 225), sidelink communications 230, and cancellation indicator 215. Prioritization between higher priority uplink communications 220 and lower priority uplink communications 225 relative to sidelink communications 230 may be referred to as intra-UE prioritization. The higher priority uplink communications 220 and lower priority uplink communications 225 may include uplink shared channel communications (e.g., PUSCH communications), uplink control channel communications (e.g., PUCCH communications), or any combinations thereof.

In some cases, on the access link 210, intra-UE prioritization may provide that when higher priority uplink communication 220 overlaps with at least a portion of lower priority uplink communication 225, the UE 115-a is expected to cancel all or a portion of the lower priority uplink communication 225. For example, the UE 115-a may be configured with resources of the lower priority uplink communication 225 and receive a scheduling PDCCH that schedules an overlapping higher priority uplink communication 220. In such cases, starting from a defined symbol after the scheduling PDCCH (e.g., from $T_{proc,2}$+d1 symbols after the end of the scheduling PDCCH, where $T_{proc,2}$ corresponds to a processing time capability for the carrier at UE 115-a, and the value d1 is a time duration corresponding to 0, 1, or 2 symbols reported by UE capability). In some cases, in such an event, the minimum processing time of the high priority channel associated with the higher priority uplink communication 220 may be extended by d2 symbols, where the value d2 is a time duration corresponding to 0, 1, or 2 symbols reported by UE capability. Further, in cases where cancellation of the lower priority uplink communication 225 occurs due to overlapping of the higher priority uplink communication 220 in a slot, the UE 115-a is not expected to be scheduled to transmit in the non-overlapping cancelled symbols.

Further, in cases where one or more sidelinks 205 are configured, intra-UE prioritization may also take into account a relative priority of sidelink communications 230 with respect to one or more uplink transmissions, which may include one or both of higher priority uplink communication 220 and lower priority uplink communication 225. In some cases, intra-UE prioritization may be used in cases where sidelinks 205 are configured for mode 1 sidelink communications, where the base station 105-a allocates resources for sidelink communications 230 between UEs 115. In cases where sidelinks 205 are configured for mode 2 sidelink communications, UEs 115 may autonomously select sidelink resources without base station 105-a control such that non-colliding resources may be selected. In mode 1 communications, the base station 105-a may provide a dynamic grant or activate a configured sidelink grant for sidelink communications 230, and sidelink feedback can be reported back to the base station 105-a by the transmitting UE 115. In mode 1, it is possible that a UE 115 may be scheduled to send an uplink transmission which overlaps with a transmission of the sidelink 205. In some cases, such a UE 115 may prioritize the overlapping transmissions based on a configured priority of the access link 210 (e.g., a priority indicated in RRC) and a priority for the sidelink 205, and determine to transmit on the access link 210 or the sidelink 205 based on the prioritization. Further, in cases, where multiple access link 210 channel communications and/or a CI may be present (e.g., cancellation indicator 215, higher priority uplink communication 220, lower priority uplink communication 225), UEs 115 may use prioritization schemes such as discussed herein to determine whether a Uu or PC5 is to be dropped or transmitted, such as prioritization techniques discussed in more detail with reference to FIG. 4.

Figure 3:
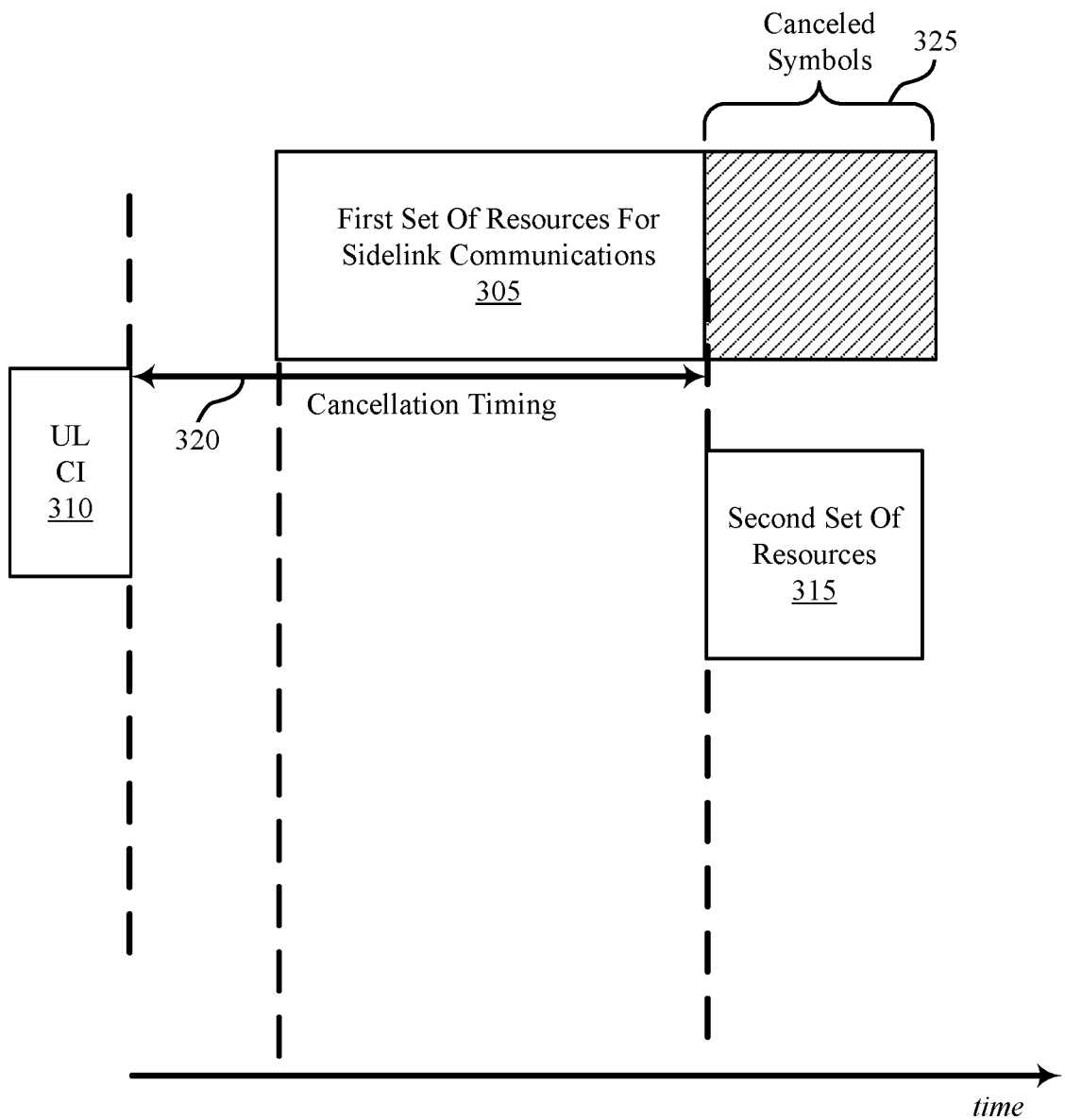
FIG. 3 illustrates an example of a cancellation indication and associated resources that supports techniques for prioritizing communication for sidelink communications in accordance with aspects of the present disclosure.

FIG. 3 illustrates an example of a cancellation indication and associated resources 300 that supports techniques for prioritizing communication for sidelink communications in accordance with aspects of the present disclosure. In some examples, cancellation indication and associated resources 300 may implement aspects of wireless communications system 100 or 200. In this example, a UE (such as a UE 115 of FIG. 1 or 2) may be configured with a first set of resources 305 for sidelink communications.

In some cases, the first set of resources 305 may be configured as part of a sidelink configuration in which two or more UEs directly communicate. In some cases, the first set of resources 305 may be configured by a serving base station (e.g., a base station 105 of FIG. 1 or 2). In this example, the UE may receive a cancellation indicator 310 that may identify a second set of resources 315 which may include higher priority resources (e.g., URLLC resources for a URLLC communication of a different UE) or lower priority resources (e.g., if the sidelink communications are high priority communications). For example, the cancellation indicator 310 indicating the second set of resources 315 may be received in advance of a configured cancellation timing 320 at the UE. The second set of resources 315 may thus be associated with communications of a different UE, and an inter-UE prioritization may be used to at the UE to determine whether to cancel all or a portion of the first set of resources 305. In some cases, the UE may cancel a portion of sidelink communications that use the first set of resources 305 that start with a starting symbol that corresponds to a first symbol indicated in the cancellation indicator 310 and continues for a number of canceled symbols 325 until the end of the first set of resources 305.

In some cases, the prioritization scheme for determine to cancel or transmit sidelink communications using the first set of resources 305 in the presence of the cancellation indicator 310 may be an inter-UE prioritization based on a configured priority associated with the cancellation indicator 310 and an associated priority of the transmission using the second set of resources 315. In such cases, when the uplink cancellation indicator 310 has priority higher than the sidelink communications that are to use the first set of resources 305, UE may obey the uplink cancellation indication and cancel all or a portion of the sidelink transmission. Likewise, when the uplink cancellation indicator 310 has a priority that is lower than the sidelink communication, the UE will ignore the uplink cancellation indicator 310 and continue the sidelink communications using the first set of resources 305. In some cases, the prioritization scheme may be configured as part of a sidelink configuration that is provided to the UE when establishing the sidelink connection with other UEs (e.g., provided in RRC signaling from a base station or other sidelink UE). In some cases, the inter-UE prioritization provides that the cancellation indicator 310 is assigned a same priority as an uplink communication of the UE on an access link (e.g., assigned a same priority as an intra-UE prioritization of an access link communication). In other cases, the UE may always ignore an uplink cancellation indicator 310 and transmit sidelink communications in the first set of resources 305 (e.g., set a sidelink prioritization as a higher prioritization than any received cancellation indicator 310, such as when the sidelink communications provide critical safety information in a V2X system, for example). Such a prioritization scheme may allow the UE and a base station to set appropriate priorities for different communications for different devices, which may enhance communications of higher priority versus lower priority data and thereby provide flexibility and efficiency in wireless communications. As discussed herein, prioritization schemes at a UE may, additionally or alternatively, include intra-UE prioritization for one or more access link communications that may overlap with sidelink communications, examples of which are discussed with respect to FIG. 4.

Figure 4:
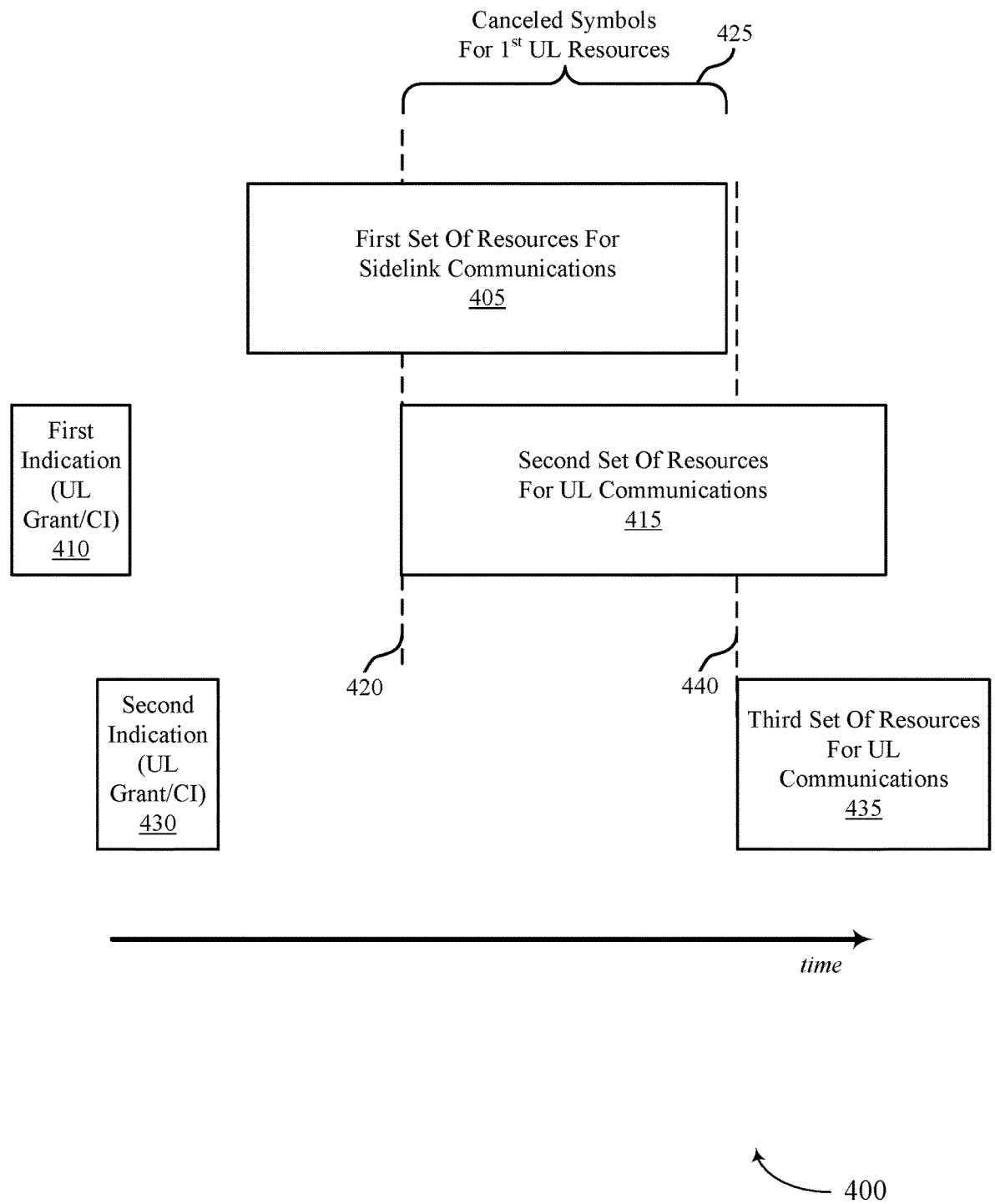
FIG. 4 illustrates an example of multiple access link resources that supports techniques for prioritizing communication for sidelink communications in accordance with aspects of the present disclosure.

FIG. 4 illustrates an example of a multiple access link resources 400 that supports techniques for prioritizing communication for sidelink communications in accordance with aspects of the present disclosure. In some examples, multiple access link resources 400 may implement aspects of wireless communications system 100 or 200. In this example, a UE (such as a UE 115 of FIG. 1 or 2) may be configured with a first set of resources 405 for sidelink communications.

In some cases, the first set of resources 405 may be configured as part of a sidelink configuration in which two or more UEs directly communicate. In some cases, the first set of resources 405 may be configured by a serving base station (e.g., a base station 105 of FIG. 1 or 2). In this example, the UE may receive first indication 410 that may identify an uplink grant, or a cancellation indication, and an associated second set of resources 415 for communications on an access link. Further, the UE may receive a second indication 430 that may identify an uplink grant, or a cancellation indication, and an associated third set of resources 435 for communications on the access link. In some cases, the first indication 410 and the second indication 430 may be associated with different channels that may have different priorities (e.g., URLLC versus eMBB communications channels) in relation to sidelink communications at the UE.

In some cases, one or more of the first indication 410 or the second indication 430 may provide a cancellation indicator. For example, the UE may be scheduled or configured to transmit on both the sidelink and access link, and receive an uplink cancellation indicator (e.g., in the second indication 430). Further, the UE may have overlapping between the sidelink resources and the access link resources. For example, the first indication 410 may provide an uplink grant for the second set of resources 415, which may overlap with time and/or frequency resources of the first set of resources 405 for sidelink communications. In this example, the second indication 430 may provide a cancellation indication. In some cases, the prioritization scheme may provide that the sidelink communications have a lower priority than the access link communications associated with the second set of resources 415. Thus, based on the first indication 410, the UE may determine to cancel a portion of sidelink symbols 425 of the first set of resources starting at a first symbol 420 of the second set of resources 415. In cases where sidelink communications have higher priority, the UE may determine to drop the uplink communication via the second set of resources 415. Further, in some cases such as illustrated in the example of FIG. 4, the second indication 430 may provide a cancellation indication which cancels at least a portion of the access link uplink transmission using the second set of resources 415. Further, in this example, the third set of resources 435 indicated by the second indication 430 may have an initial symbol 440 start time that results in the third set of resources 435 being non-overlapping with the first set of resources 405. Based on the configured prioritization scheme, the UE may determine to cancel one or more of the communications using the first set of resources 405 or the second set of resources 415.

In some cases, the prioritization scheme may provide that the UE is to initially determine overlapping conditions between sidelink and access link transmissions without considering any cancellation indications that may be received. Thus, in such cases, the uplink cancellation indication provided in the second indication 430 may be honored after access link and sidelink prioritization of communications using the first set of resources 405 and the second set of resources 415. Thus, in this example, if the prioritization scheme provides that the sidelink communications have priority over the access link communications associated with the first indication 410, the UE may transmit sidelink communications using the first set of resources 405, and drop the uplink communications using the second set of resources 415. In such cases, the cancellation indication provided in the second indication 430 indicates the third set of resources 435 that are non-overlapping with the first set of resources 405 and thus the UE can ignore the cancellation indication provided in the second indication 430. In cases where a cancellation indication indicates resources that do overlap with the first set of resources 405 and the UE has prioritized sidelink communications over access link communications, the UE may perform inter-UE prioritization in a manner such as discussed with respect to FIG. 3. Further, in cases where the prioritization scheme prioritizes the access link transmissions over sidelink transmissions, the UE may drop transmissions for the canceled sidelink symbols 425 of the sidelink transmission, and then determine whether to drop portions of the second set of resources 415 that overlap with the third set or resources 435 based on an access link inter-UE prioritization (e.g., by dropping symbols of the second set of resources 415 starting with initial symbol 440 start time of the third set of resources 435).

In other cases, the prioritization scheme may provide that the UE applies an uplink cancellation indication on both access link and sidelink communications, and then prioritizes the access link and sidelink communications afterwards. In such cases, in the example of FIG. 4, the UE may thus apply the cancellation indication of the second indication 430 to the sidelink transmission using the first set of resources 405 and to the access link transmission using the second set of resources 415. In some cases, the prioritization scheme may provide that since the access link communications using the second set of resources 415 are partially or completely canceled, the sidelink communications are to be transmitted using the first set of resources 405 which do not collide with the third set of resources 435. In other cases, the sidelink or access link communication may be selected based on a percentage of which communication would be canceled based on the cancellation indication, based on a priority of a communications channel associated with the access link and sidelink communication, based on which communication has an earlier starting time, or any combinations thereof.

In further cases, the first indication 410 may provide an uplink grant for a first channel (e.g., an eMBB channel) and the second indication 430 may provide an uplink grant for a second channel (e.g., a URLLC channel). Thus, the UE may be scheduled or configured to transmit on both the sidelink and access link, and may also be scheduled or configured with transmissions of different priorities on the access link. In some cases, when sidelink communications have lower priority than access link communications, the UE may drop the sidelink transmission. However, after intra-UE access link prioritization, the UE may drop the low priority access link transmission and only keep high priority transmission. In such a case, in the example of FIG. 4, the UE may thus drop the access link transmission using the second set of resources 415 and keep the access link transmission using the third set of resources 435, resulting in the access link and sidelink transmissions no longer overlapping.

In some cases, the prioritization scheme may provide that the UE is to prioritize between sidelink transmissions and access link transmissions before intra-UE access link prioritization. Such a prioritization scheme may provide that multiple access link transmissions are treated as an entire entity and then compared with the sidelink transmission. As long as there is any overlapping between sidelink and access link resources, the prioritization between access link and sidelink is exercised and the high priority one gets picked for transmission and the lower priority communication is dropped. In such cases, if access link communications have higher priority, the UE may then perform prioritization between the multiple access link transmissions. In the example of FIG. 4, the second set of resources 415 may be associated with eMBB communications having a lower priority than sidelink communications, but the third set of resources 435 may be associated with URLLC communications having higher priority than sidelink communications, and thus access link has a higher priority than sidelink and the sidelink communications are dropped (e.g., either the entire sidelink transmission or a portion of the sidelink transmission corresponding to canceled sidelink symbols 425). The UE may then perform intra-UE access link prioritization to determine whether all or a portion of access link communications using the second set of resources 415 and third set of resources are transmitted or canceled.

In other cases, the prioritization scheme may provide that multiple access link transmissions are compared to the sidelink transmission separately based on the priority between sidelink and access link communications. If more than one access link transmissions are picked, the UE may then perform access link prioritization afterwards. In the example of FIG. 4 in which the second set of resources 415 may be associated with eMBB communications having a lower priority than sidelink communications, but the third set of resources 435 may be associated with URLLC communications having higher priority than sidelink communications, such a prioritization scheme would thus provide that the eMBB communications on the access link are dropped, and the sidelink and URLLC transmissions are each transmitted as they are non-overlapping.

In other cases, the prioritization scheme may provide that the UE performs intra-UE access link transmission prioritization first, then prioritizes with sidelink transmissions afterwards. Such a prioritization may provide that, in the example of FIG. 4, the second set of resources 415 associated with eMBB communications may be dropped in favor of the higher priority URLLC communications in the third set of resources 435. Then, the sidelink prioritization may provide that the sidelink communications are transmitted using the non-overlapping first set of resources 405. In other examples where the third set of resources 435 would overlap the first set of resources 405, the priority of the sidelink communication may be compared to the priority of the third set of resources 435, and the higher priority communication may be transmitted and the lower priority communication dropped.

Figure 5:
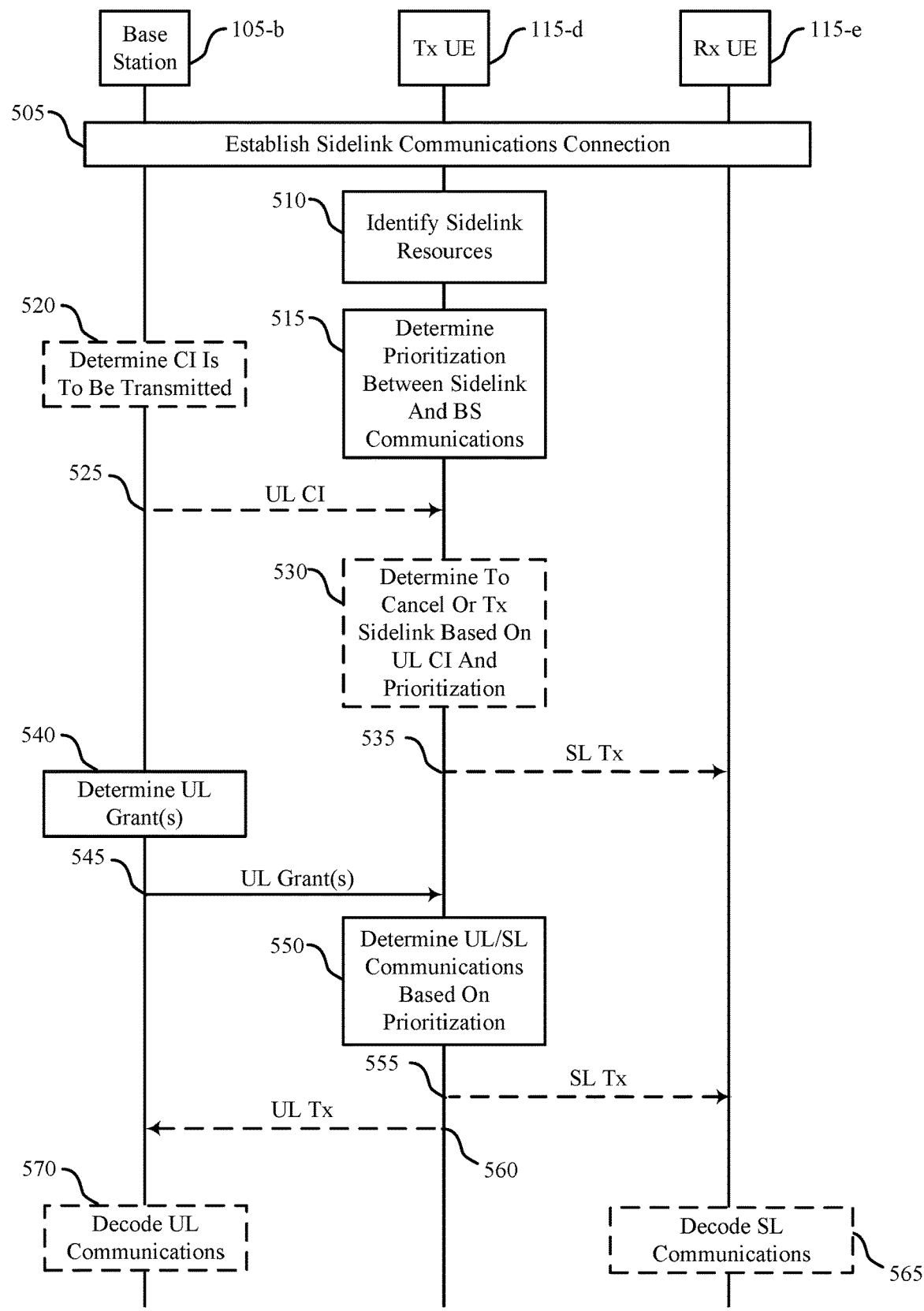
FIG. 5 illustrates an example of a process flow that supports techniques for prioritizing communication for sidelink communications in accordance with aspects of the present disclosure.

FIG. 5 illustrates an example of a process flow 500 that supports techniques for prioritizing communication for sidelink communications in accordance with aspects of the present disclosure. In some examples, process flow 500 may implement aspects of wireless communications system 100 or 200. Process flow 500 may be implemented by a transmitting UE 115-d, a receiving UE 115-e, and a serving base station 105-b, which may be examples of UEs 115 and base stations 105 as described herein. Alternative examples of the following may be implemented, where some steps are performed in a different order than described or are not performed at all. In some cases, steps may include additional features not mentioned below, or further steps may be added.

At 505, the transmitting UE 115-*d*, receiving UE 115-*e*, and base station 105-*b* may establish a sidelink communications connection between the transmitting UE 115-*d* and receiving UE 115-*e*. In some cases, sidelink communications may be unicast communications. In other cases, the sidelink communications may be broadcast or groupcast communications to multiple UEs 115.

At 510, the transmitting UE 115-*d* may identify sidelink resources for one or more sidelink transmissions to the receiving UE 115-*e* and optionally one or more other receiving UEs in the case of broadcast or groupcast transmissions. In some cases, the sidelink resources may be configured by the base station 105-*b*, in accordance with mode 1 sidelink communications. In some cases, the sidelink resources may be configured resources (e.g., configured by RRC signaling), that may be activated or deactivated by the base station 105-*b*.

At 515, the transmitting UE 115-*d* may determine prioritization between sidelink and base station communications. In some cases, the prioritization may be determined based on a prioritization scheme that is configured at the transmitting UE 115-*d*. The prioritization scheme may be configured or activated by the base station 105-*b*, in some cases (e.g., in RRC signaling that configures sidelink communications, in a medium access control (MAC) control element, etc.). The prioritization scheme may include inter-UE prioritization of access link and sidelink communications, intra-UE prioritization of access link and sidelink communications, or any combinations thereof, as discussed herein.

Optionally, at 520, the base station 105-*b* may determine that a cancellation indicator is to be transmitted. In some cases, such a determination may be made based on the base station 105-*b* identifying high priority communications that are to be transmitted instead of one or more lower priority communications. In some cases, the base station 105-*b* may determine resources associated with the high priority communication, and configure a set of bits to be transmitted with the cancellation indicator to indicate one or more symbol, PRBs, or combinations thereof, that include the high priority communications. At 525, the base station 105-*b* may transmit the uplink cancellation indicator to the transmitting UE 115-*d*.

At 530, the transmitting UE 105-*d* may receive the cancellation indicator and determine to cancel or transmit a sidelink communication based on the cancellation indicator and the prioritization scheme. In some cases, the transmitting UE 105-*d* may determine that resources provided by the cancellation indicator overlap with the sidelink communications resources, and initiate the prioritization scheme based on the overlapping resources. Based on the prioritization scheme, the transmitting UE 115-*d* may cancel or transmit the sidelink transmission. In cases where sidelink communications are prioritized ahead of the cancellation indication, the transmitting UE 115-*d* may transmit sidelink transmission at 535. In cases where the cancellation indication is prioritized ahead of the sidelink communications, the transmitting UE 115-*d* may cancel the sidelink transmission.

At 540, the base station 105-*b* may determine one or more uplink grants for uplink communications on an access link between the transmitting UE 115-*d* and the base station 105-*b*. In some cases, two or more uplink grants may be provided by the base station 105-*b* for two or more different types of communications on the access link (e.g., ULRRC communications, eMBB communications, etc.). At 545, the base station 105-*b* may transmit the uplink grant(s) to the transmitting UE 115-*d*.

At 550, the transmitting UE 115-*d* may receive the uplink grant(s) and determine to transmit or cancel uplink and sidelink communications based on the prioritization scheme and the uplink grant(s). In some cases, the prioritization scheme may provide that prioritization of the uplink communications on the access link with the base station 105-*b* is performed first, with a resultant priority then used for prioritization between access link and sidelink communications. In other cases, the prioritization scheme may provide that each uplink grant is prioritized separately against the sidelink transmission, and in cases where multiple access link transmissions remain after prioritization with the sidelink, the access link transmissions may be prioritized according to an intra-UE access link prioritization.

Based on the prioritization scheme indicating that the sidelink communication is to be transmitted, the transmitting UE 115-*d* may transmit, at 555, the sidelink communication to the receiving UE 115-*e*. At 560, based on the prioritization scheme indicating that one or more access link communications are to be transmitted, the transmitting UE 115-*d* may transmit access link communication(s) to the base station 105-*b*. At 565, the receiving UE 115-*e* may decode any sidelink communications that were transmitted by the transmitting UE 115-*d*. Likewise, at 570, the base station 105-*b* may decode any sidelink communications that were transmitted by the transmitting UE 115-*d*.

Figure 6:
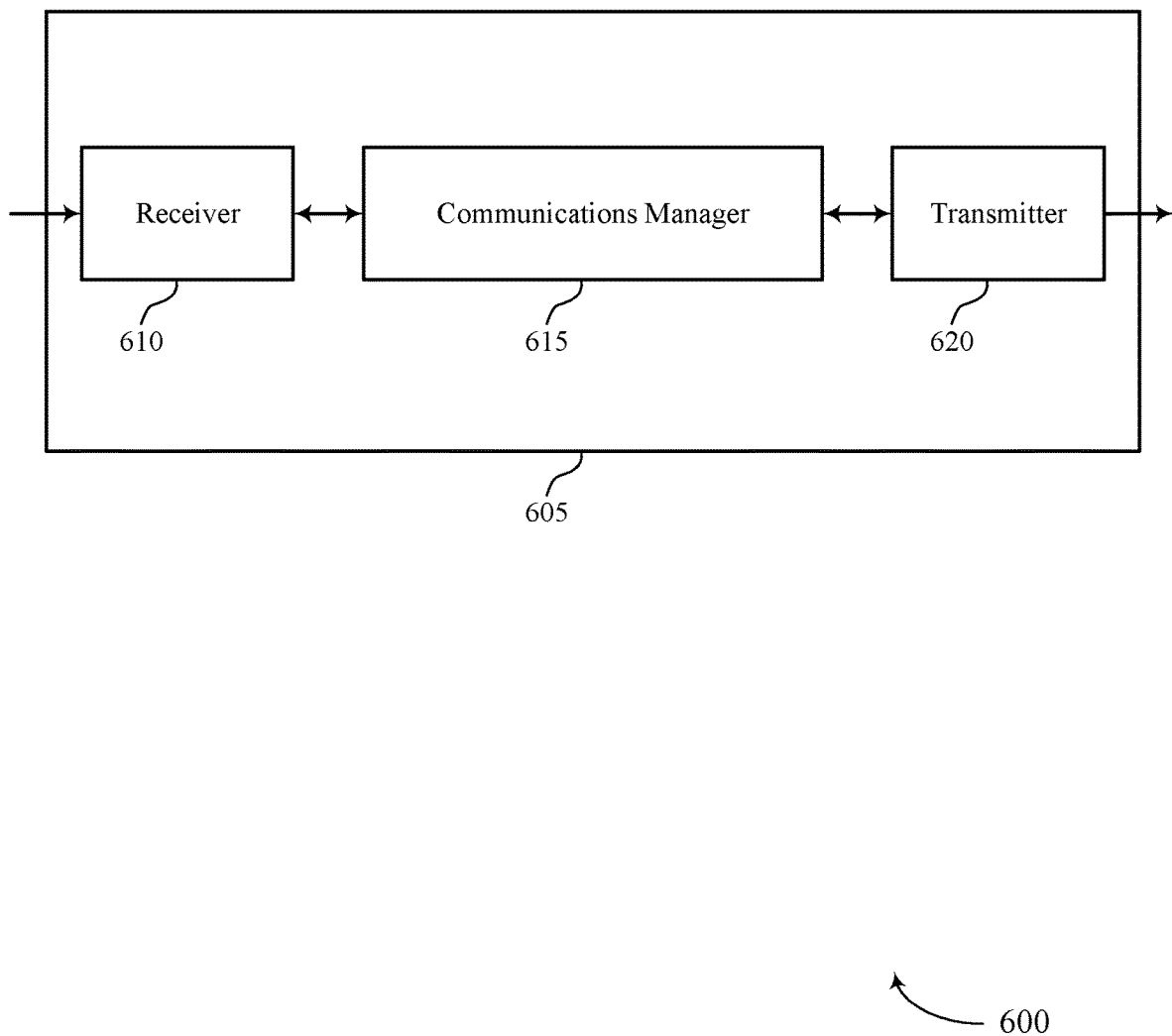
FIGS. 6 and 7 show block diagrams of devices that support techniques for prioritizing communication for sidelink communications in accordance with aspects of the present disclosure.

FIG. 6 shows a block diagram 600 of a device 605 that supports techniques for prioritizing communication for sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for prioritizing communication for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first set of resources for a first sidelink communication with a second UE, where the first sidelink communication has a first priority, receive a first indication of a second set of resources for a second communication, the second communication having a second priority, where the second set of resources at least partially overlaps with the first set of resources, receive a second indication of a third set of resources for a third communication, the third communication having a third priority, and determine to drop or to transmit the first sidelink communication based on a prioritization scheme associated with the first priority, the second priority, and the third priority. The communications manager 615 may be an example of aspects of the communications manager 910 described herein.

The communications manager 615 may as described herein be implemented to realize one or more potential advantages. One implementation may allow the device 605 to more reliably determine to drop or transmit communications based on an associated priority level, which may allow for enhanced reliability and reduced latency for certain higher priority communications. Further, implementations may allow the device 605 to reduce the latency of communications, and increase signaling reliability, throughput, and user experience, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
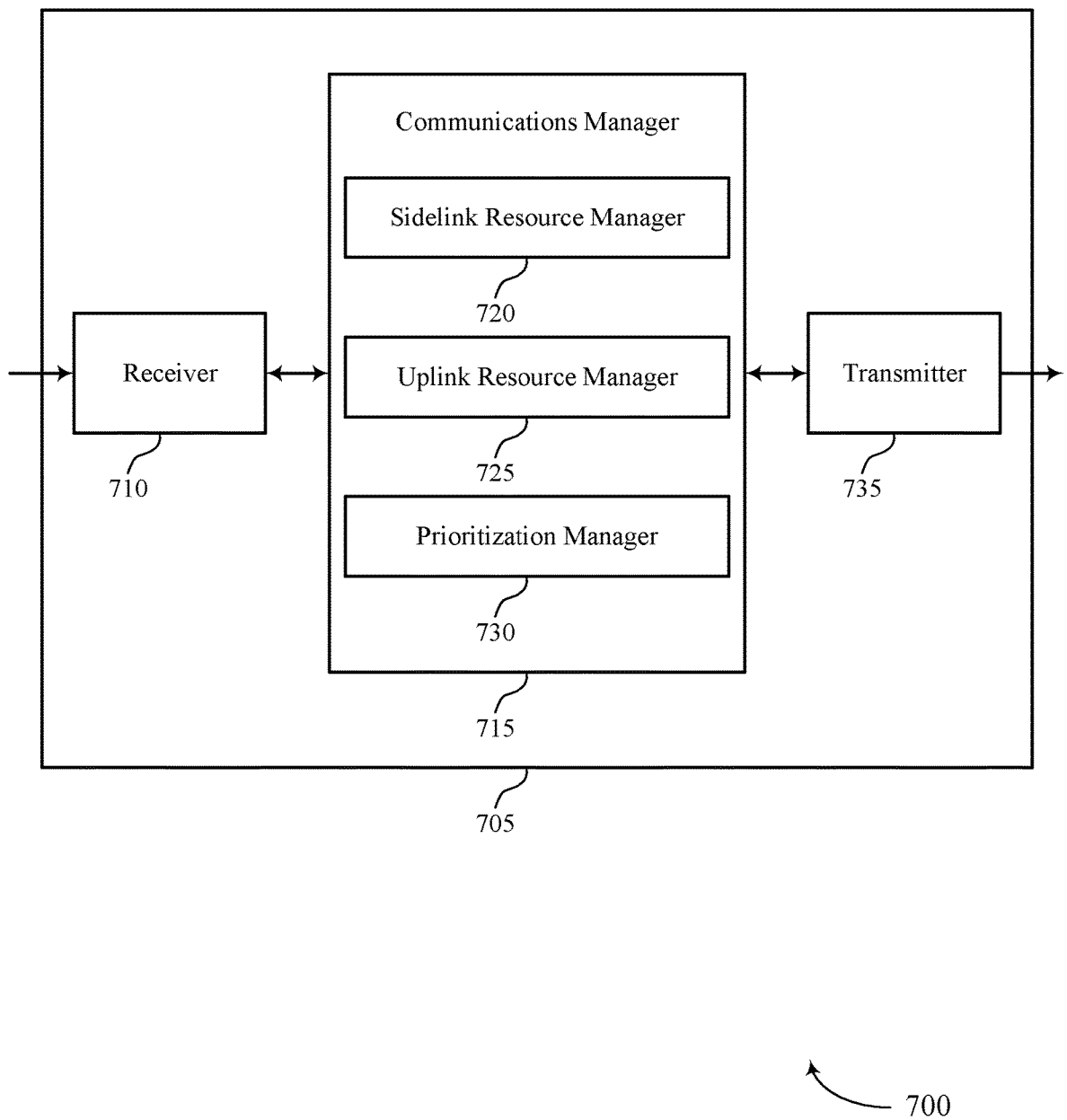

FIG. 7 shows a block diagram 700 of a device 705 that supports techniques for prioritizing communication for sidelink communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for prioritizing communication for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink resource manager 720, an uplink resource manager 725, and a prioritization manager 730. The communications manager 715 may be an example of aspects of the communications manager 910 described herein.

The sidelink resource manager 720 may identify a first set of resources for a first sidelink communication with a second UE, where the first sidelink communication has a first priority.

The uplink resource manager 725 may receive a first indication of a second set of resources for a second communication, the second communication having a second priority, where the second set of resources at least partially overlaps with the first set of resources and receive a second indication of a third set of resources for a third communication, the third communication having a third priority.

The prioritization manager 730 may determine to drop or to transmit the first sidelink communication based on a prioritization scheme associated with the first priority, the second priority, and the third priority.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
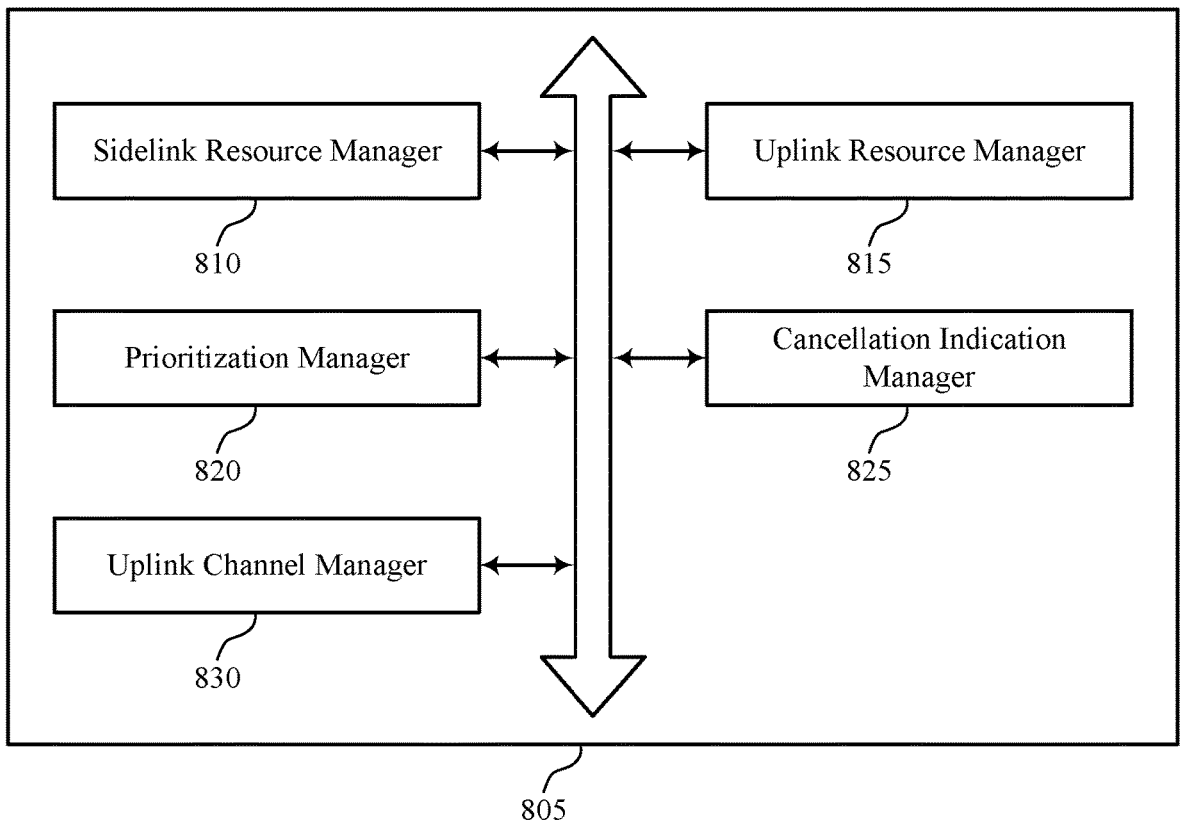
FIG. 8 shows a block diagram of a communications manager that supports techniques for prioritizing communication for sidelink communications in accordance with aspects of the present disclosure.

FIG. 8 shows a block diagram 800 of a communications manager 805 that supports techniques for prioritizing communication for sidelink communications in accordance with aspects of the present disclosure. The communications manager 805 may be an example of aspects of a communications manager 615, a communications manager 715, or a communications manager 910 described herein. The communications manager 805 may include a sidelink resource manager 810, an uplink resource manager 815, a prioritization manager 820, a cancellation indication manager 825, and an uplink channel manager 830. Each of these modules may communicate, directly or indirectly, with one another (e.g., via one or more buses).

The sidelink resource manager 810 may identify a first set of resources for a first sidelink communication with a second UE, where the first sidelink communication has a first priority.

The uplink resource manager 815 may receive a first indication of a second set of resources for a second communication, the second communication having a second priority, where the second set of resources at least partially overlaps with the first set of resources. In some examples, the uplink resource manager 815 may receive a second indication of a third set of resources for a third communication, the third communication having a third priority.

The prioritization manager 820 may determine to drop or to transmit the first sidelink communication based on a prioritization scheme associated with the first priority, the second priority, and the third priority. In some examples, the prioritization manager 820 may determine to drop the first sidelink communication based on the second priority having a higher priority than the first priority. In some examples, the prioritization manager 820 may determine to transmit the first sidelink communication based on the second priority having a lower priority than the first priority. In some examples, the prioritization manager 820 may determine which of the third communication or the first sidelink communication has a higher priority prior to determining whether to honor an uplink cancellation indication.

In some examples, the prioritization manager 820 may determine to drop the first sidelink communication based on both the first uplink communication and the second uplink communication having a higher priority than the first sidelink communication. In some examples, the prioritization manager 820 may determine which of the first uplink communication or the second uplink communication to transmit based on a respective first channel priority and second channel priority. In some examples, the prioritization manager 820 may determine that the first uplink communication has priority over the second uplink communication based on the first channel priority and the second channel priority. In some examples, the prioritization manager 820 may set the second priority to correspond to the first channel priority.

In some examples, the prioritization manager 820 may determine which of the first sidelink communication or the first uplink communication to transmit based on the first priority and the second priority. In some cases, the prioritization scheme provides priorities between the first sidelink communication and an inter-UE cancellation indication that is associated with the second communication, between the first sidelink communication and an intra-UE channel prioritization for uplink communications with a base station over two or more channels, or any combinations thereof. In some cases, the second priority is assigned a same priority level as one or more uplink communications between the first UE and the base station.

In some cases, the prioritization scheme provides priorities between the first sidelink communication, an uplink cancellation indication (UL CI) from the base station that indicates the second priority and the second set of resources, and the third communication between the first UE and a base station. In some cases, the first priority is assigned a higher priority level than the second priority, and the first sidelink communication always has priority relative to uplink cancellation indications.

In some cases, the prioritization scheme further provides that prioritization is performed separately for the first sidelink communication and each of the first uplink communication and the second uplink communication.

The cancellation indication manager 825 may receive an uplink cancellation indication (UL CI) from a base station that indicates the second set of resources, and where the UL CI is associated with the second priority and indicates one or more different UEs than the first UE is to transmit using the second set of resources. In some examples, the cancellation indication manager 825 may determine whether the second priority associated with the UL CI is a higher priority than one or more of the first priority or the third priority prior to determining whether the first priority is a higher priority than the third priority.

The uplink channel manager 830 may manage priorities of two or more different uplink channels. In some cases, the prioritization scheme provides priorities between the first sidelink communication, a first uplink communication between the first UE and a base station that has a first channel priority, and a second uplink communication between the first UE and the base station that has a second channel priority, and where the third set of resources is associated with one or more of the first uplink communication or the second uplink communication. In some cases, the prioritization scheme further provides that prioritization between the first sidelink communication and first and second uplink communications is performed prior to prioritization between the first uplink communication and the second uplink communication. In some cases, a highest priority of the first channel priority and the second channel priority is selected as the second priority. In some cases, the prioritization between the first uplink communication and the second uplink communication is determined when the second priority is higher than the first priority and the first sidelink communication is dropped.

Figure 9:
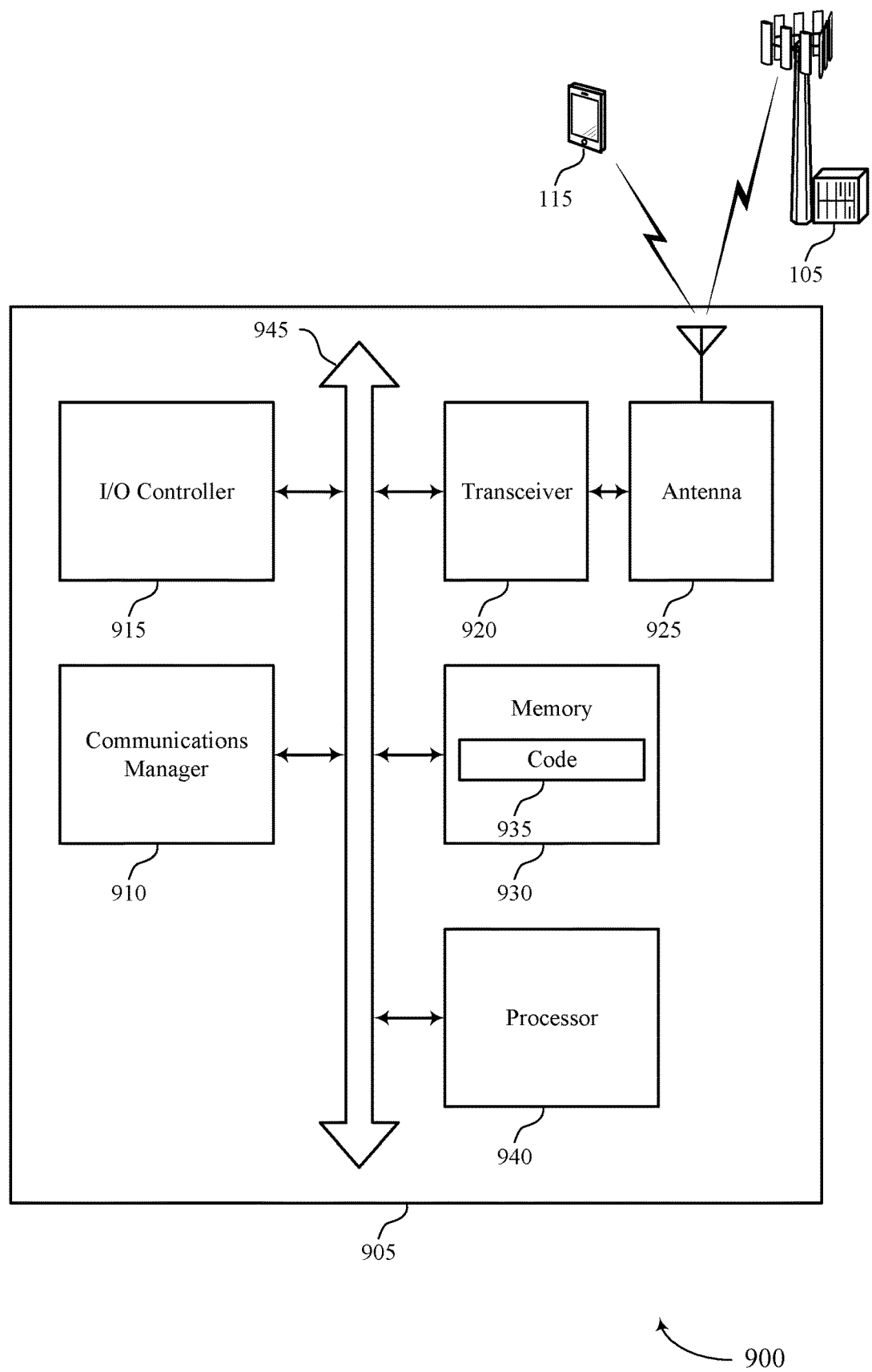
FIG. 9 shows a diagram of a system including a device that supports techniques for prioritizing communication for sidelink communications in accordance with aspects of the present disclosure.

FIG. 9 shows a diagram of a system 900 including a device 905 that supports techniques for prioritizing communication for sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a first set of resources for a first sidelink communication with a second UE, where the first sidelink communication has a first priority, receive a first indication of a second set of resources for a second communication, the second communication having a second priority, where the second set of resources at least partially overlaps with the first set of resources, receive a second indication of a third set of resources for a third communication, the third communication having a third priority, and determine to drop or to transmit the first sidelink communication based on a prioritization scheme associated with the first priority, the second priority, and the third priority.

The communications manager 910 may as described herein be implemented to realize one or more potential advantages. One implementation may allow the device 905 to more reliably determine to drop or transmit communications based on an associated priority level, which may allow for enhanced reliability and reduced latency for certain higher priority communications. Further, implementations may allow the device 905 to reduce the latency of communications, and increase signaling reliability, throughput, and user experience, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for prioritizing communication for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
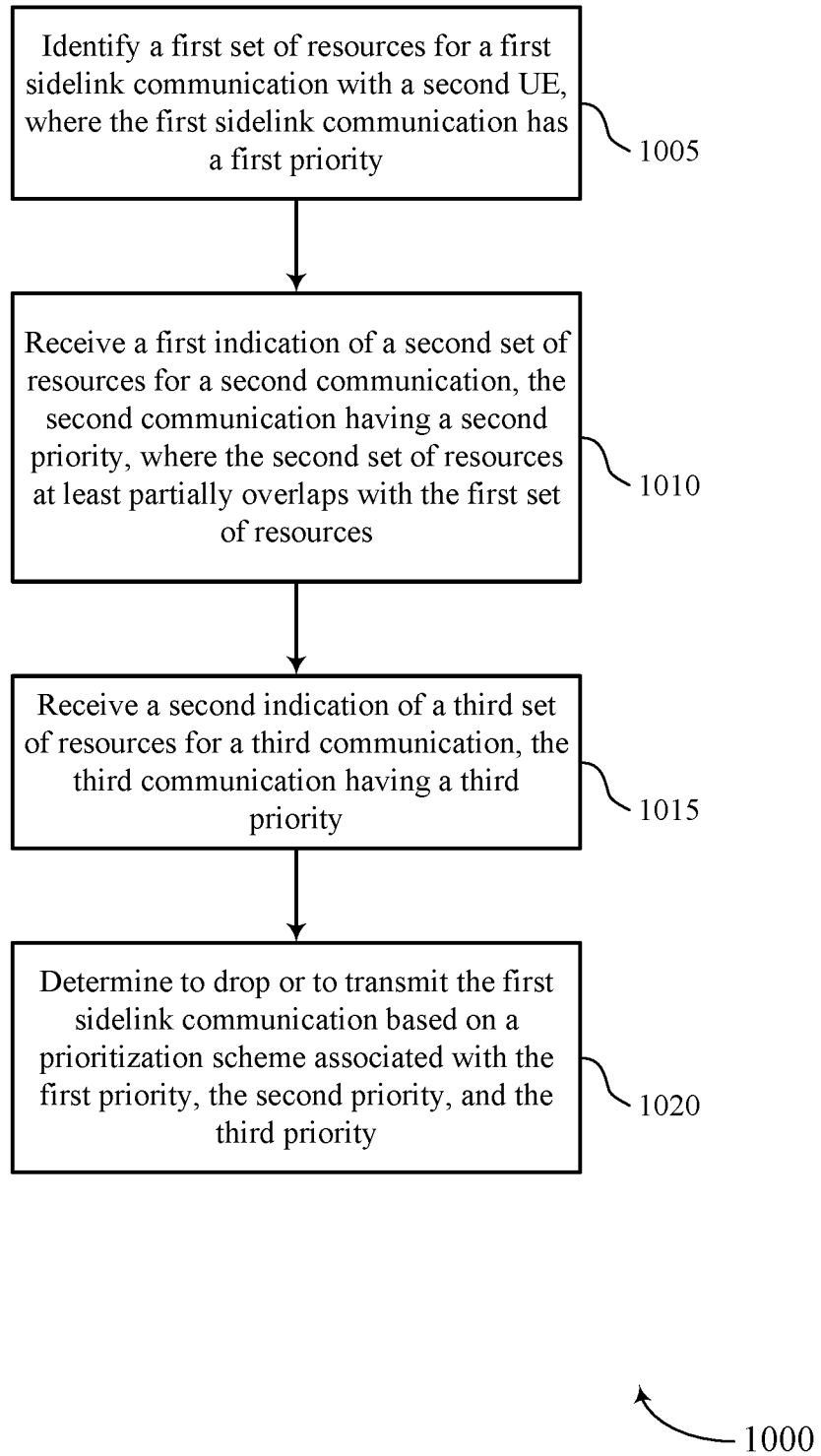
FIGS. 10 through 14 show flowcharts illustrating methods that support techniques for prioritizing communication for sidelink communications in accordance with aspects of the present disclosure.

FIG. 10 shows a flowchart illustrating a method 1000 that supports techniques for prioritizing communication for sidelink communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may identify a first set of resources for a first sidelink communication with a second UE, where the first sidelink communication has a first priority. The operations of 1005 may be performed according to the methods described herein. In some examples, aspects of the operations of 1005 may be performed by a sidelink resource manager as described with reference to FIGS. 6 through 9.

At 1010, the UE may receive a first indication of a second set of resources for a second communication, the second communication having a second priority, where the second set of resources at least partially overlaps with the first set of resources. The operations of 1010 may be performed according to the methods described herein. In some examples, aspects of the operations of 1010 may be performed by an uplink resource manager as described with reference to FIGS. 6 through 9.

At 1015, the UE may receive a second indication of a third set of resources for a third communication, the third communication having a third priority. The operations of 1015 may be performed according to the methods described herein. In some examples, aspects of the operations of 1015 may be performed by an uplink resource manager as described with reference to FIGS. 6 through 9.

At 1020, the UE may determine to drop or to transmit the first sidelink communication based on a prioritization scheme associated with the first priority, the second priority, and the third priority. The operations of 1020 may be performed according to the methods described herein. In some examples, aspects of the operations of 1020 may be performed by a prioritization manager as described with reference to FIGS. 6 through 9.

Figure 11:
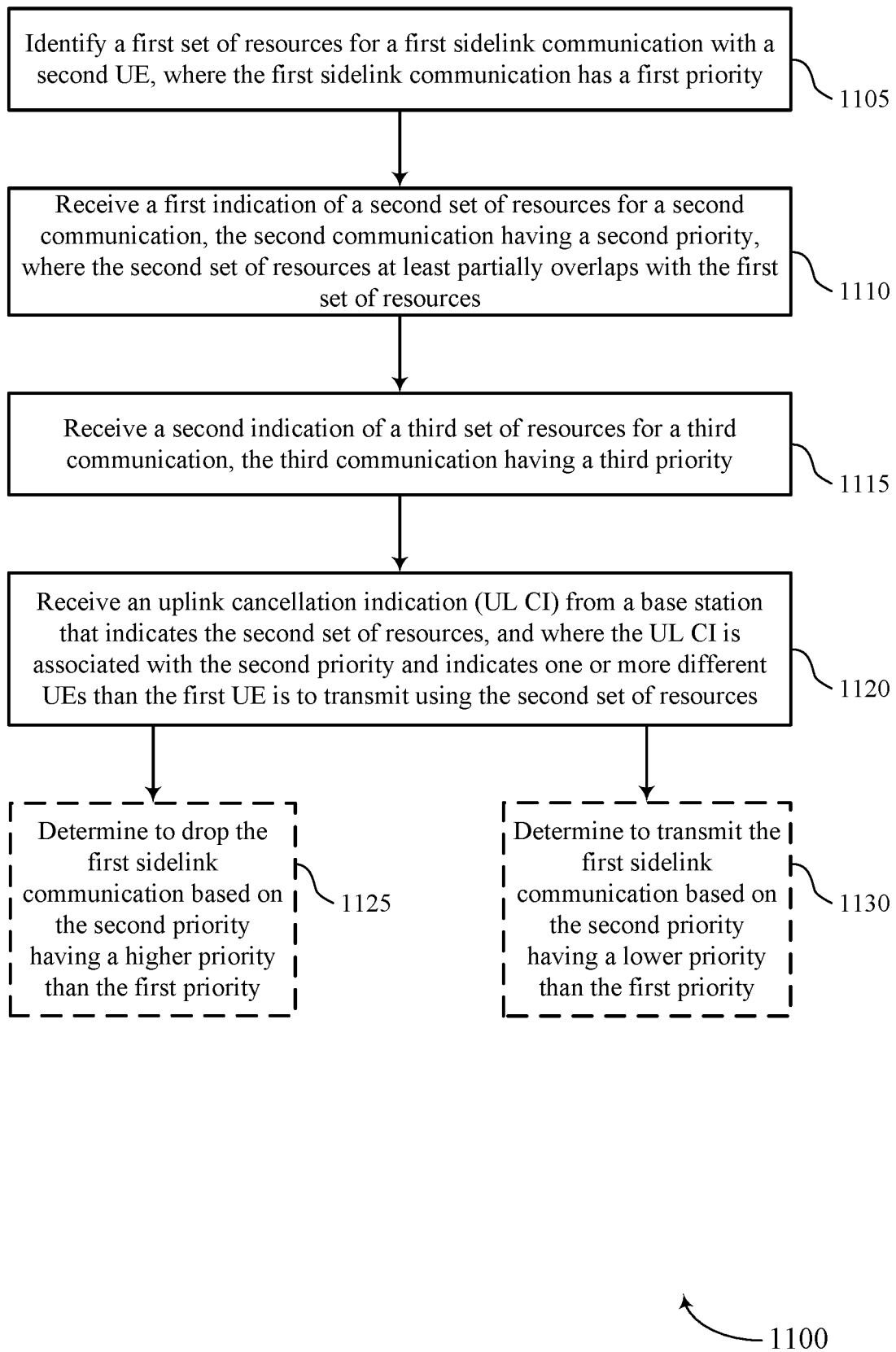

FIG. 11 shows a flowchart illustrating a method 1100 that supports techniques for prioritizing communication for sidelink communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may identify a first set of resources for a first sidelink communication with a second UE, where the first sidelink communication has a first priority. The operations of 1105 may be performed according to the methods described herein. In some examples, aspects of the operations of 1105 may be performed by a sidelink resource manager as described with reference to FIGS. 6 through 9.

At 1110, the UE may receive a first indication of a second set of resources for a second communication, the second communication having a second priority, where the second set of resources at least partially overlaps with the first set of resources. The operations of 1110 may be performed according to the methods described herein. In some examples, aspects of the operations of 1110 may be performed by an uplink resource manager as described with reference to FIGS. 6 through 9.

At 1115, the UE may receive a second indication of a third set of resources for a third communication, the third communication having a third priority. The operations of 1115 may be performed according to the methods described herein. In some examples, aspects of the operations of 1115 may be performed by an uplink resource manager as described with reference to FIGS. 6 through 9.

At 1120, the UE may receive an uplink cancellation indication (UL CI) from a base station that indicates the second set of resources, and where the UL CI is associated with the second priority and indicates one or more different UEs than the first UE is to transmit using the second set of resources. The operations of 1120 may be performed according to the methods described herein. In some examples, aspects of the operations of 1120 may be performed by a cancellation indication manager as described with reference to FIGS. 6 through 9.

Optionally, at 1125, the UE may determine to drop the first sidelink communication based on the second priority having a higher priority than the first priority. The operations of 1125 may be performed according to the methods described herein. In some examples, aspects of the operations of 1125 may be performed by a prioritization manager as described with reference to FIGS. 6 through 9.

Optionally, at 1130, the UE may determine to transmit the first sidelink communication based on the second priority having a lower priority than the first priority. The operations of 1130 may be performed according to the methods described herein. In some examples, aspects of the operations of 1130 may be performed by a prioritization manager as described with reference to FIGS. 6 through 9.

Figure 12:
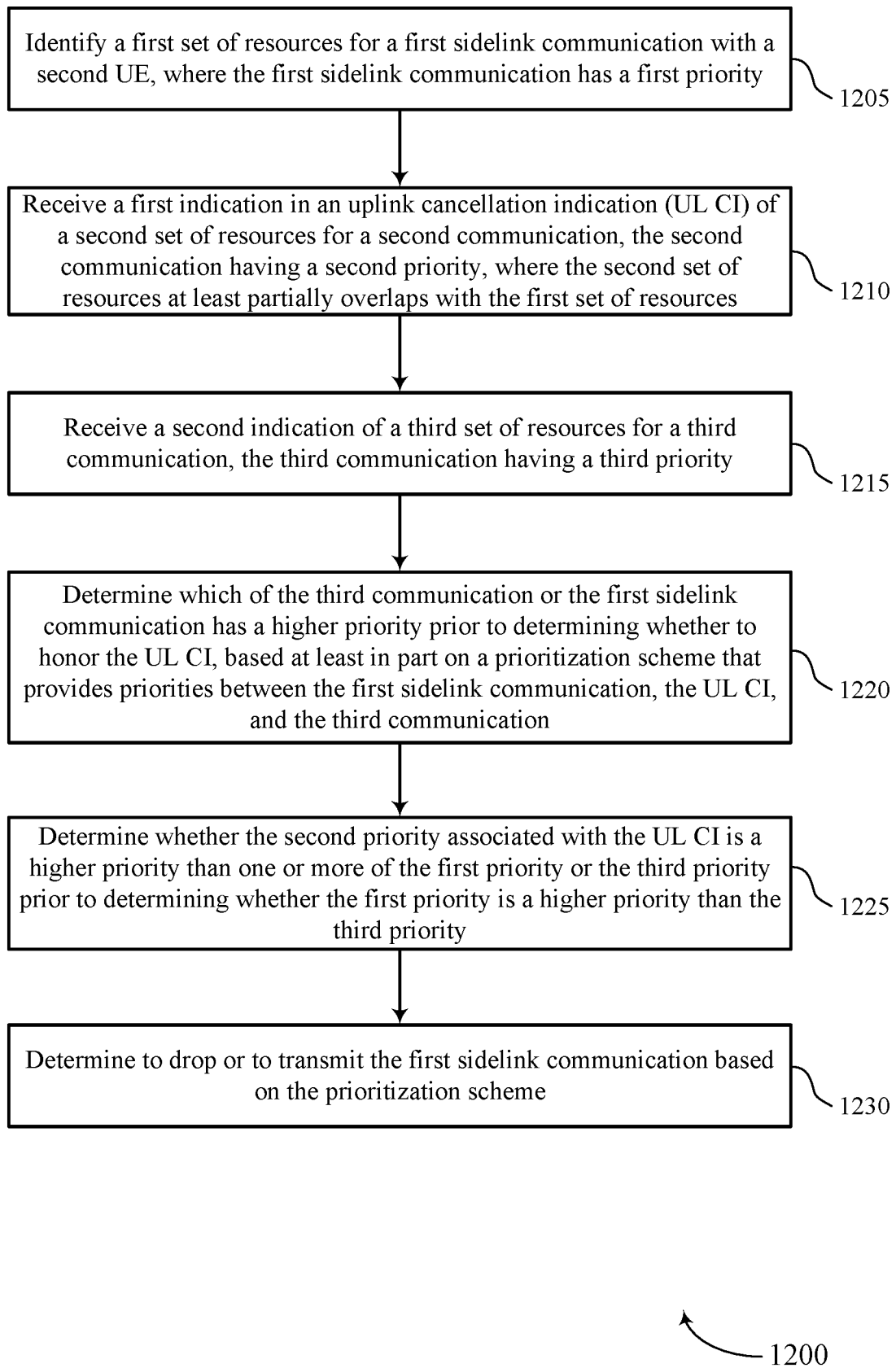

FIG. 12 shows a flowchart illustrating a method 1200 that supports techniques for prioritizing communication for sidelink communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify a first set of resources for a first sidelink communication with a second UE, where the first sidelink communication has a first priority. The operations of 1205 may be performed according to the methods described herein. In some examples, aspects of the operations of 1205 may be performed by a sidelink resource manager as described with reference to FIGS. 6 through 9.

At 1210, the UE may receive a first indication in an uplink cancellation indication (UL CI) of a second set of resources for a second communication, the second communication having a second priority, where the second set of resources at least partially overlaps with the first set of resources. The operations of 1210 may be performed according to the methods described herein. In some examples, aspects of the operations of 1210 may be performed by an uplink resource manager as described with reference to FIGS. 6 through 9.

At 1215, the UE may receive a second indication of a third set of resources for a third communication, the third communication having a third priority. The operations of 1215 may be performed according to the methods described herein. In some examples, aspects of the operations of 1215 may be performed by an uplink resource manager as described with reference to FIGS. 6 through 9. In some cases, the UE has a prioritization scheme that provides priorities between the first sidelink communication, an uplink cancellation indication (UL CI) from the base station, and the third communication between the first UE and the base station.

At 1220, the UE may determine which of the third communication or the first sidelink communication has a higher priority prior to determining whether to honor the UL CI, based at least in part on a prioritization scheme that provides priorities between the first sidelink communication, the UL CI, and the third communication. The operations of 1220 may be performed according to the methods described herein. In some examples, aspects of the operations of 1220 may be performed by a prioritization manager as described with reference to FIGS. 6 through 9.

At 1225, the UE may determine whether the second priority associated with the UL CI is a higher priority than the first priority or the third priority prior to determining whether the first priority is a higher priority than the third priority. The operations of 1225 may be performed according to the methods described herein. In some examples, aspects of the operations of 1225 may be performed by a cancellation indication manager as described with reference to FIGS. 6 through 9.

At 1230, the UE may determine to drop or to transmit the first sidelink communication based on the prioritization scheme. The operations of 1230 may be performed according to the methods described herein. In some examples, aspects of the operations of 1230 may be performed by a prioritization manager as described with reference to FIGS. 6 through 9.

Figure 13:
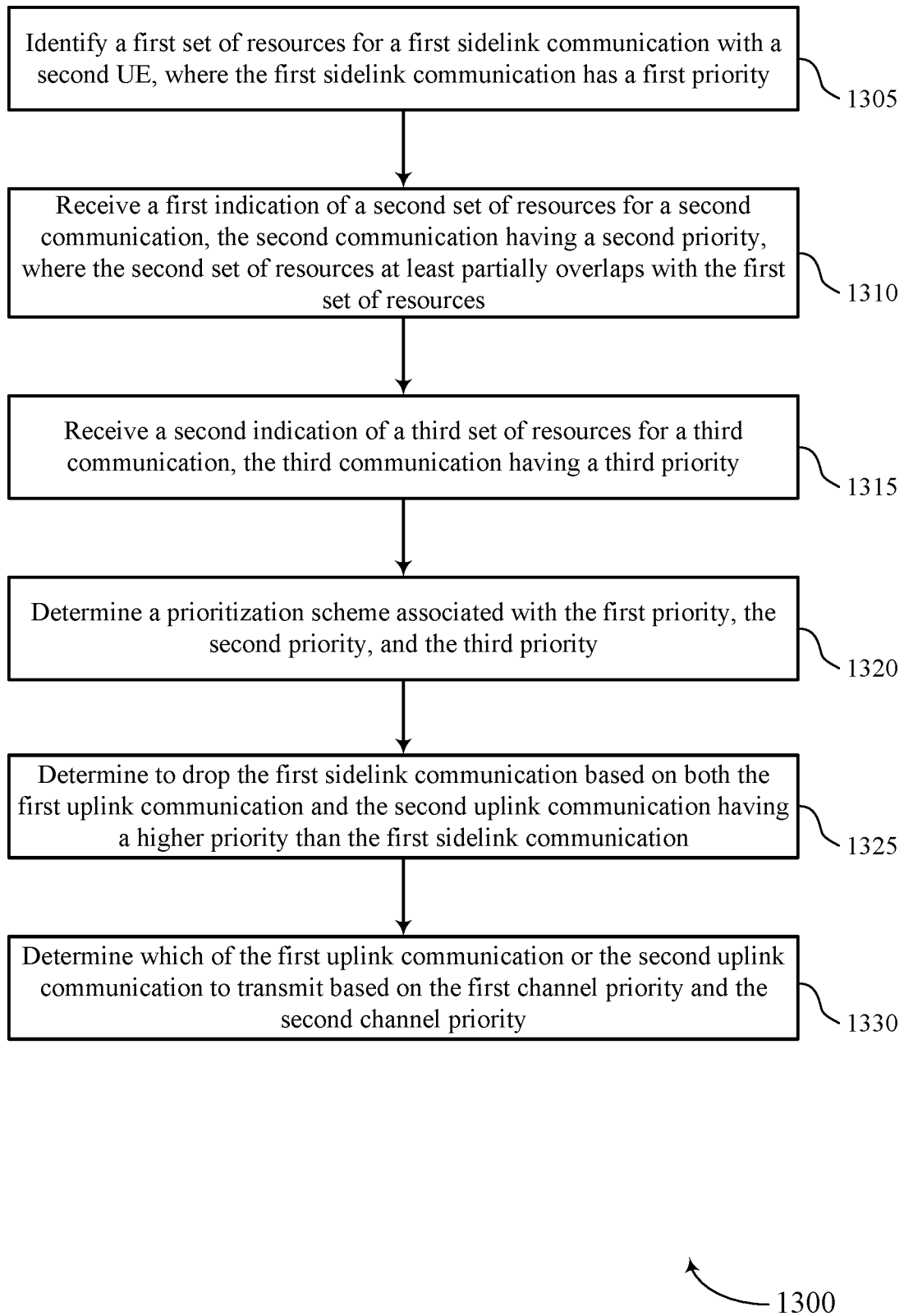

FIG. 13 shows a flowchart illustrating a method 1300 that supports techniques for prioritizing communication for sidelink communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may identify a first set of resources for a first sidelink communication with a second UE, where the first sidelink communication has a first priority. The operations of 1305 may be performed according to the methods described herein. In some examples, aspects of the operations of 1305 may be performed by a sidelink resource manager as described with reference to FIGS. 6 through 9.

At 1310, the UE may receive a first indication of a second set of resources for a second communication, the second communication having a second priority, where the second set of resources at least partially overlaps with the first set of resources. The operations of 1310 may be performed according to the methods described herein. In some examples, aspects of the operations of 1310 may be performed by an uplink resource manager as described with reference to FIGS. 6 through 9.

At 1315, the UE may receive a second indication of a third set of resources for a third communication, the third communication having a third priority. The operations of 1315 may be performed according to the methods described herein. In some examples, aspects of the operations of 1315 may be performed by an uplink resource manager as described with reference to FIGS. 6 through 9.

At 1320, the UE may determine a prioritization scheme associated with the first priority, the second priority, and the third priority. The operations of 1320 may be performed according to the methods described herein. In some examples, aspects of the operations of 1320 may be performed by a prioritization manager as described with reference to FIGS. 6 through 9. In some cases, the prioritization scheme provides priorities between the first sidelink communication, a first uplink communication between the first UE and a base station that has a first channel priority, and a second uplink communication between the first UE and the base station that has a second channel priority, and where the third set of resources is associated with one or more of the first uplink communication or the second uplink communication. In some cases, the prioritization scheme further provides that prioritization is performed separately for the first sidelink communication and each of the first uplink communication and the second uplink communication.

At 1325, the UE may determine to drop the first sidelink communication based on both the first uplink communication and the second uplink communication having a higher priority than the first sidelink communication. The operations of 1325 may be performed according to the methods described herein. In some examples, aspects of the operations of 1325 may be performed by a prioritization manager as described with reference to FIGS. 6 through 9.

At 1330, the UE may determine which of the first uplink communication or the second uplink communication to transmit based on the first channel priority and the second channel priority. The operations of 1330 may be performed according to the methods described herein. In some examples, aspects of the operations of 1330 may be performed by a prioritization manager as described with reference to FIGS. 6 through 9.

Figure 14:
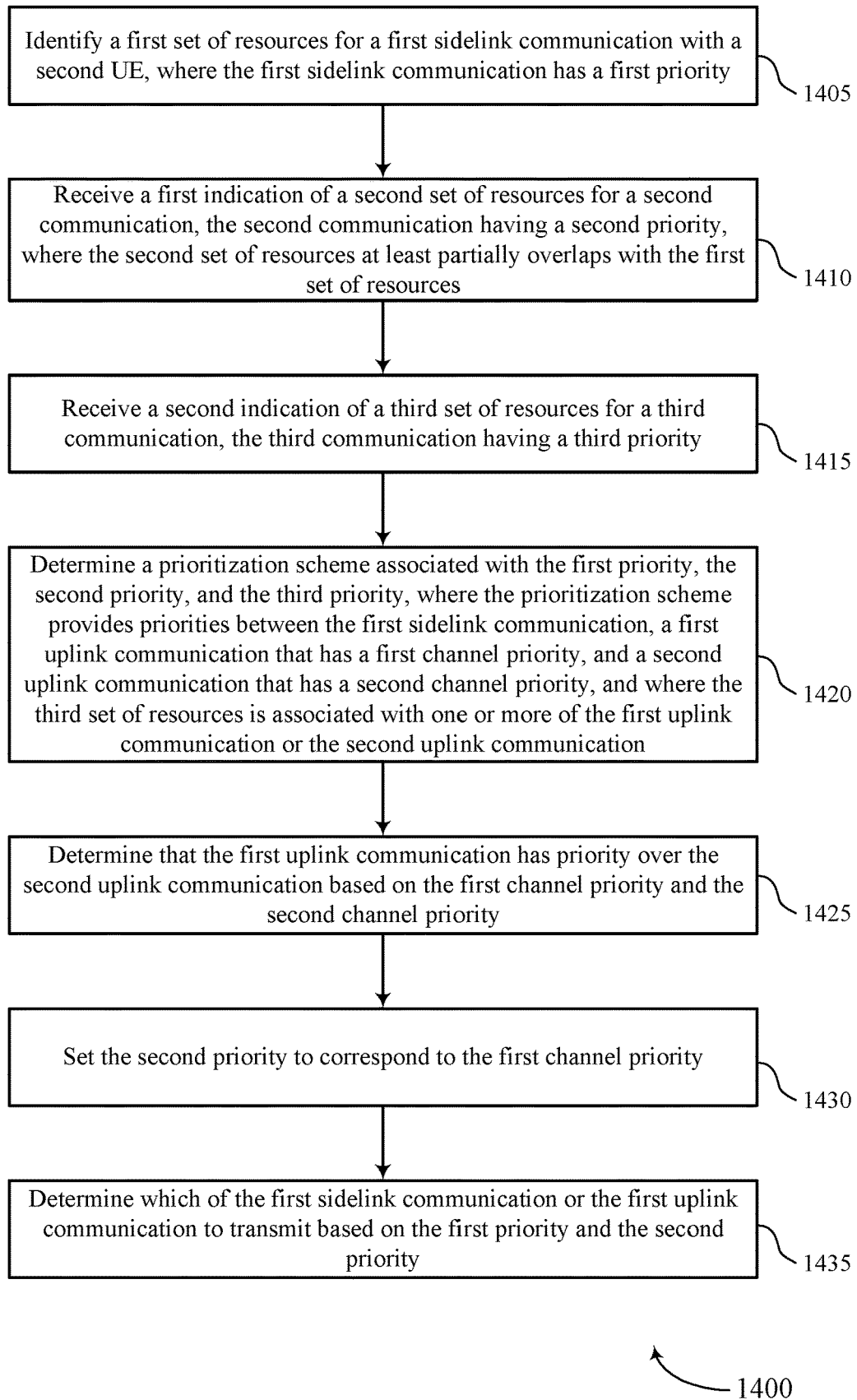

FIG. 14 shows a flowchart illustrating a method 1400 that supports techniques for prioritizing communication for sidelink communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a first set of resources for a first sidelink communication with a second UE, where the first sidelink communication has a first priority. The operations of 1405 may be performed according to the methods described herein. In some examples, aspects of the operations of 1405 may be performed by a sidelink resource manager as described with reference to FIGS. 6 through 9.

At 1410, the UE may receive a first indication of a second set of resources for a second communication, the second communication having a second priority, where the second set of resources at least partially overlaps with the first set of resources. The operations of 1410 may be performed according to the methods described herein. In some examples, aspects of the operations of 1410 may be performed by an uplink resource manager as described with reference to FIGS. 6 through 9.

At 1415, the UE may receive a second indication of a third set of resources for a third communication, the third communication having a third priority. The operations of 1415 may be performed according to the methods described herein. In some examples, aspects of the operations of 1415 may be performed by an uplink resource manager as described with reference to FIGS. 6 through 9.

At 1420, the UE may determine a prioritization scheme associated with the first priority, the second priority, and the third priority, where the prioritization scheme provides priorities between the first sidelink communication, a first uplink communication that has a first channel priority, and a second uplink communication that has a second channel priority, and where the third set of resources is associated with one or more of the first uplink communication or the second uplink communication. The operations of 1420 may be performed according to the methods described herein. In some examples, aspects of the operations of 1420 may be performed by a prioritization manager as described with reference to FIGS. 6 through 9.

At 1425, the UE may determine that the first uplink communication has priority over the second uplink communication based on the first channel priority and the second channel priority. The operations of 1425 may be performed according to the methods described herein. In some examples, aspects of the operations of 1425 may be performed by a prioritization manager as described with reference to FIGS. 6 through 9.

At 1430, the UE may set the second priority to correspond to the first channel priority. The operations of 1430 may be performed according to the methods described herein. In some examples, aspects of the operations of 1430 may be performed by a prioritization manager as described with reference to FIGS. 6 through 9.

At 1435, the UE may determine which of the first sidelink communication or the first uplink communication to transmit based on the first priority and the second priority. The operations of 1435 may be performed according to the methods described herein. In some examples, aspects of the operations of 1435 may be performed by a prioritization manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving first control information for a first sidelink communication with a second UE on a first set of resources; receiving second control information for two or more uplink communications to a base station on a second set of resources, the second set of resources at least partially overlapping with the first set of resources; prioritizing the two or more uplink communications to the base station based at least in part on an access link prioritization; and prioritizing, after the prioritizing the two or more uplink communications, one or more sidelink communications and one or more of the uplink communications based at least in part on a sidelink prioritization.

Aspect 2: The method of aspect 1, wherein the sidelink prioritization provides priorities between the one or more sidelink communications and a first uplink communication of the two or more uplink communications.

Aspect 3: The method of aspect 2, wherein the access link prioritization provides priorities between the two or more uplink communications based at least in part on an uplink channel, a priority of uplink data associated with the uplink communications, or any combinations thereof, to identify the first uplink communication.

Aspect 4: The method of aspect 3, wherein a highest priority of the two or more uplink communications is selected as the first uplink communication for use in the sidelink prioritization.

Aspect 5: The method of any of aspects 3 through 4, wherein the first uplink communication is selected for transmission in the sidelink prioritization when a priority associated with the first uplink communication is higher than a priority of the first sidelink communication, and the first uplink communication is dropped when the priority associated with the first uplink communication is lower than a priority of the first sidelink communication.

Aspect 6: The method of any of aspects 2 through 5, wherein the sidelink prioritization provides that prioritization is performed separately for the one or more sidelink communications and the first uplink communication.

Aspect 7: The method of aspect 6, further comprising: determining to drop the first sidelink communication based at least in part on one or more of the uplink communications having a higher priority than the first sidelink communication; and determining which of the first uplink communication or a second uplink communication to transmit based at least in part on the access link prioritization.

Aspect 8: The method of any of aspects 2 through 7, further comprising:
determining that the first uplink communication has priority over a second uplink communication of the two or more uplink communications based at least in part on a first channel priority associated with the first uplink communication and a second channel priority associated with the second uplink communication; setting an access link priority of the sidelink prioritization to correspond to the first channel priority; and determining which of the first sidelink communication or the first uplink communication to transmit based at least in part on the access link priority and the sidelink prioritization.

Aspect 9: The method of any of aspects 1 through 8, further comprising: receiving a cancellation indication to cancel one or more of the uplink communications, and wherein the cancellation indication is ignored with respect to sidelink communications.

Aspect 10: The method of any of aspects 1 through 9, wherein the sidelink prioritization provides priorities between the first sidelink communication and an inter-UE cancellation indication that is associated with one or more of the uplink communications or sidelink communications, between the first sidelink communication and an intra-UE channel prioritization for the two or more uplink communications with the base station over two or more channels, or any combinations thereof.

Aspect 11: The method of any of aspects 1 through 10, further comprising: receiving an uplink cancellation indication (UL CI) from the base station that indicates the second set of resources, and wherein the UL CI is associated with a second priority and indicates at least one different UE than the first UE is to transmit using the second set of resources.

Aspect 12: An apparatus for wireless communication at a first UE, comprising a processor; memory coupled with the processor; and instructions stored in the memory and executable by the processor to cause the apparatus to perform a method of any of aspects 1 through 11.

Aspect 13: An apparatus for wireless communication at a first UE, comprising at least one means for performing a method of any of aspects 1 through 11.

Aspect 14: A non-transitory computer-readable medium storing code for wireless communication at a first UE, the code comprising instructions executable by a processor to perform a method of any of aspects 1 through 11.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving first control information for one or more sidelink communications with a second UE on a first set of resources, the one or more sidelink communications including a first sidelink communication with the second UE;
   receiving second control information for two or more uplink communications to an access network entity on a second set of resources that at least partially overlaps with the first set of resources;
   identifying that a first uplink communication of the two or more uplink communications has a first priority that is a higher priority than a second priority of a second uplink communication of the two or more uplink communications; and
   determining, after the identifying, that the first priority of the first uplink communication of the two or more uplink communications is to be compared with a third priority of the one or more sidelink communications to prioritize the first uplink communication or one or more sidelink communications for transmission.

2. The method of claim 1, wherein a sidelink prioritization provides priorities between the one or more sidelink communications and the first uplink communication.

3. The method of claim 2, wherein an access link prioritization provides priorities between the two or more uplink communications based at least in part on one or more of an uplink channel or a priority of uplink data associated with the uplink communication, to identify the first uplink communication.

4. The method of claim 3, wherein a highest priority of the two or more uplink communications is selected as the first uplink communication for use in the sidelink prioritization.

5. The method of claim 3, wherein the first uplink communication is selected for transmission when a priority associated with the first uplink communication is higher than the third priority of the one or more sidelink communications, and wherein the first uplink communication is dropped when the first priority associated with the first uplink communication is lower than the third priority of the one or more sidelink communications.

6. The method of claim 3, wherein the sidelink prioritization provides that prioritization is performed separately for the one or more sidelink communications and the first uplink communication.

7. The method of claim 6, further comprising:
   determining to drop a first sidelink communication based at least in part on one or more of the uplink communications having a higher priority than the first sidelink communication; and
   determining which of the first uplink communication or a second uplink communication to transmit based at least in part on the access link prioritization.

8. The method of claim 2, further comprising:
   determining that the first uplink communication has priority over a second uplink communication of the two or more uplink communications based at least in part on a first channel priority associated with the first uplink communication and a second channel priority associated with the second uplink communication;
   setting an access link priority of the sidelink prioritization to correspond to the first channel priority; and
   determining which of a first sidelink communication or the first uplink communication to transmit based at least in part on the access link priority and the sidelink prioritization.

9. The method of claim 1, further comprising:
   receiving a cancellation indication to cancel one or more of the uplink communications, and wherein the cancellation indication is ignored with respect to sidelink communications.

10. The method of claim 1, wherein a sidelink prioritization provides priorities between a first sidelink communication and an inter-UE cancellation indication that is associated with one or more of the uplink communications or sidelink communications, or between the first sidelink communication and an intra-UE channel prioritization for the two or more uplink communications with the access network entity over two or more channels.

11. The method of claim 1, further comprising:
   receiving an uplink cancellation indication (UL CI) from the access network entity that indicates the second set of resources, and wherein the UL CI is associated with the second priority and indicates at least one different UE than the first UE is to transmit using the second set of resources.

12. An apparatus for wireless communication at a first user equipment (UE), comprising:
   a processor,
   memory coupled with the processor; and
   instructions stored in the memory and executable by the processor to cause the apparatus to:
     receive first control information for one or more sidelink communications with a second UE on a first set of resources, the one or more sidelink communications including a first sidelink communication with the second UE;
     receive second control information for two or more uplink communications to an access network entity on a second set of resources that at least partially overlaps with the first set of resources;
     identify that a first uplink communication of the two or more uplink communications has a first priority that is a higher priority than a second priority of a second uplink communication of the two or more uplink communication; and determine, after identifying that the first uplink communication has the first priority, that the first priority of the first uplink communication of the two or more uplink communications is to be compared with a third priority of the one or more sidelink communications to prioritize the first uplink communication or one or more sidelink communications for transmission.

13. The apparatus of claim 12, wherein a sidelink prioritization provides priorities between the one or more sidelink communications and the first uplink communication.

14. The apparatus of claim 13, wherein an access link prioritization provides priorities between the two or more uplink communications based at least in part on one or more of an uplink channel or a priority of uplink data associated with the uplink communications, to identify the first uplink communication.

15. The apparatus of claim 14, wherein a highest priority of the two or more uplink communications is selected as the first uplink communication for use in the sidelink prioritization.

16. The apparatus of claim 13, wherein the first uplink communication is selected for transmission when a priority associated with the first uplink communication is higher than the third priority of the one or more sidelink communications, and wherein the first uplink communication is dropped when the first priority associated with the first uplink communication is lower than the third priority of the one or more sidelink communications.

17. The apparatus of claim 13, wherein the sidelink prioritization provides that prioritization is performed separately for the one or more sidelink communications and the first uplink communication.

18. The apparatus of claim 17, wherein the instructions are further executable by the processor to cause the apparatus to:

determine to drop a first sidelink communication based at least in part on one or more of the uplink communications having a higher priority than the first sidelink communication; and determine which of the first uplink communication or a second uplink communication to transmit based at least in part on an access link prioritization.

19. The apparatus of claim 13, wherein the instructions are further executable by the processor to cause the apparatus to:

determine that the first uplink communication has priority over a second uplink communication of the two or more uplink communications based at least in part on a first channel priority associated with the first uplink communication and a second channel priority associated with the second uplink communication;

set an access link priority of the sidelink prioritization to correspond to the first channel priority; and determine which of a first sidelink communication or the first uplink communication to transmit based at least in part on the access link priority and the sidelink prioritization.

20. The apparatus of claim 12, wherein a sidelink prioritization provides priorities between a first sidelink communication and an inter-UE cancellation indication that is associated with one or more of the uplink communications or sidelink communications, or between the first sidelink communication and an intra-UE channel prioritization for the two or more uplink communications with the access network entity over two or more channels.

21. The apparatus of claim 12, wherein the instructions are further executable by the processor to cause the apparatus to:

receive an uplink cancellation indication (UL CI) from the access network entity that indicates the second set of resources, and wherein the UL CI is associated with the second priority and indicates at least one different UE than the first UE is to transmit using the second set of resources.

22. An apparatus for wireless communication at a first user equipment (UE), comprising:

means for receiving first control information for one or more sidelink communications with a second UE on a first set of resources, the one or more sidelink communications including a first sidelink communication with the second UE;

means for receiving second control information for two or more uplink communications to an access network entity on a second set of resources that at least partially overlaps with the first set of resources;

means for identifying that a first uplink communication of the two or more uplink communications has a first priority that is a higher priority than a second priority of a second uplink communication of the two or more uplink communications; and means for determining, after the identifying, that the first priority of the first uplink communication of the two or more uplink communications is to be compared with a third priority of the one or more sidelink communications to prioritize the first uplink communication or one or more sidelink communications for transmission.

23. The apparatus of claim 22, wherein a sidelink prioritization provides priorities between the one or more sidelink communications and the first uplink communication.

24. The apparatus of claim 23, wherein an access link prioritization provides priorities between the two or more uplink communications based at least in part on one or more of an uplink channel or a priority of uplink data associated with the uplink communications, to identify the first uplink communication.

25. The apparatus of claim 24, wherein a highest priority of the two or more uplink communications is selected as the first uplink communication for use in the sidelink prioritization.

26. The apparatus of claim 24, wherein the first uplink communication is selected for transmission when a priority associated with the first uplink communication is higher than the third priority of the one or more sidelink communications, and wherein the first uplink communication is dropped when the first priority associated with the first uplink communication is lower than the third priority of the one or more sidelink communications.

27. The apparatus of claim 23, wherein the sidelink prioritization provides that prioritization is performed separately for the one or more sidelink communications and the first uplink communication.

28. A non-transitory computer-readable medium storing code for wireless communication at a first user equipment (UE), the code comprising instructions executable by a processor to:

receive first control information for one or more sidelink communications with a second UE on a first set of resources, the one or more sidelink communications including a first sidelink communication with the second UE;

receive second control information for two or more uplink communications to an access network entity on a second set of resources that at least partially overlaps with the first set of resources;

identify that a first uplink communication of the two or more uplink communications has a first priority that is a higher priority than a second priority of a second uplink communication of the two or more uplink communications; and determine, after identifying that the first uplink communication has the first priority, that the first priority of the first uplink communication of the two or more uplink communications is to be compared with a third priority of the one or more sidelink communications to prioritize the first uplink communication or one or more sidelink communications for transmission.

29. The non-transitory computer-readable medium of claim 28, wherein a sidelink prioritization provides priorities between the one or more sidelink communications and the first uplink communication.

30. The non-transitory computer-readable medium of claim 29, wherein an access link prioritization provides priorities between the two or more uplink communications based at least in part on one or more of an uplink channel or a priority of uplink data associated with the uplink communications, to identify the first uplink communication.

* * * * *